(12) United States Patent
Miyazawa

(10) Patent No.: US 9,569,155 B2
(45) Date of Patent: Feb. 14, 2017

(54) MEDIATION SERVER AND IMAGE PROCESSING DEVICE

(71) Applicant: BROTHER KOGYO KABUSHIKI KAISHA, Nagoya-shi, Aichi-ken (JP)

(72) Inventor: Masafumi Miyazawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/580,502

(22) Filed: Dec. 23, 2014

(65) Prior Publication Data
US 2015/0178029 A1 Jun. 25, 2015

(30) Foreign Application Priority Data
Dec. 25, 2013 (JP) ................................ 2013-267695

(51) Int. Cl.
*G06F 3/12* (2006.01)
*H04N 1/00* (2006.01)

(52) U.S. Cl.
CPC ........... *G06F 3/1253* (2013.01); *G06F 3/1205* (2013.01); *G06F 3/1206* (2013.01); *G06F 3/1258* (2013.01); *G06F 3/1285* (2013.01); *H04N 1/0035* (2013.01)

(58) Field of Classification Search
CPC .... G06F 3/1253; G06F 3/1206; G06F 3/1205; G06F 3/1258; G06F 3/1285; H04N 1/0035; H04N 1/003
See application file for complete search history.

(56) References Cited

U.S. PATENT DOCUMENTS

| 2005/0046899 A1* | 3/2005 | Matsuda | G03G 15/502 358/1.18 |
| 2012/0113464 A1* | 5/2012 | Inoue | H04N 1/00151 358/1.15 |
| 2013/0095890 A1* | 4/2013 | Kono | G06F 3/1204 455/557 |
| 2015/0029533 A1* | 1/2015 | Sato | G06F 3/1238 358/1.14 |

FOREIGN PATENT DOCUMENTS

JP 2012099011 A 5/2012

\* cited by examiner

*Primary Examiner* — Iriana Cruz
(74) *Attorney, Agent, or Firm* — Scully, Scott, Murphy & Presser, PC

(57) ABSTRACT

A mediation server supplies service selection screen information to a multifunction device. Service selection screens are screens for selecting a target service from a plurality of service-related information. The service selection screen information includes a plurality of target service object corresponding to a plurality of service objects so that the plurality of services are included in the service selection screens. The mediation server acquires selection information indicating the target service and then supplies first setting screen information to the multifunction device. The first setting screen information includes a target service-related information corresponding to the target service so that the target service corresponding to the target service is included in a first setting screen. Then, the mediation server executes mediation communication for mediating provision of the target service.

20 Claims, 17 Drawing Sheets

FIG. 2

(ONE EXAMPLE OF DATA IN MULTIFUNCTION DEVICE)

PLURAL PIECES OF LAYOUT INFORMATION 36

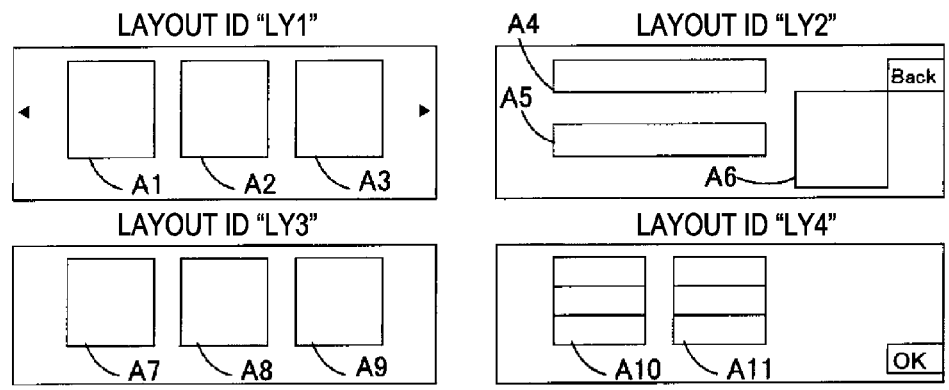

SFL TABLE 38

| USER NAME | PASSWORD | PRINT | SCAN |
|---|---|---|---|
| U1 | PU1 | OK | OK |
| U2 | PU2 | NG | OK |
| ... | ... | ... | ... |

SERVICE USER TABLE 40

| SERVICE NAME | ACCOUNT NAME | PASSWORD | FACE ID |
|---|---|---|---|
| SVA | AN0 | PN0 | IDF0 |
| SVE | AN1 | PN1 | IDF1 |
| ... | ... | ... | ... |

FIG. 3

(EXAMPLE OF DATA IN MEDIATION SERVER)

SERVICE OB TABLE 76

| URL | SERVICE NAME | IMAGE DATA |
|---|---|---|
| USA | SVA | A |
| USB | SVB | B |
| ... | ... | ... |
| UH | HISTORY | History |

FACE OB TABLE 78

| URL | FACE ID | IMAGE DATA |
|---|---|---|
| UF1 | IDF1 | \(^ ^)/ |
| UF2 | IDF2 | (^_^) |
| ... | ... | ... |

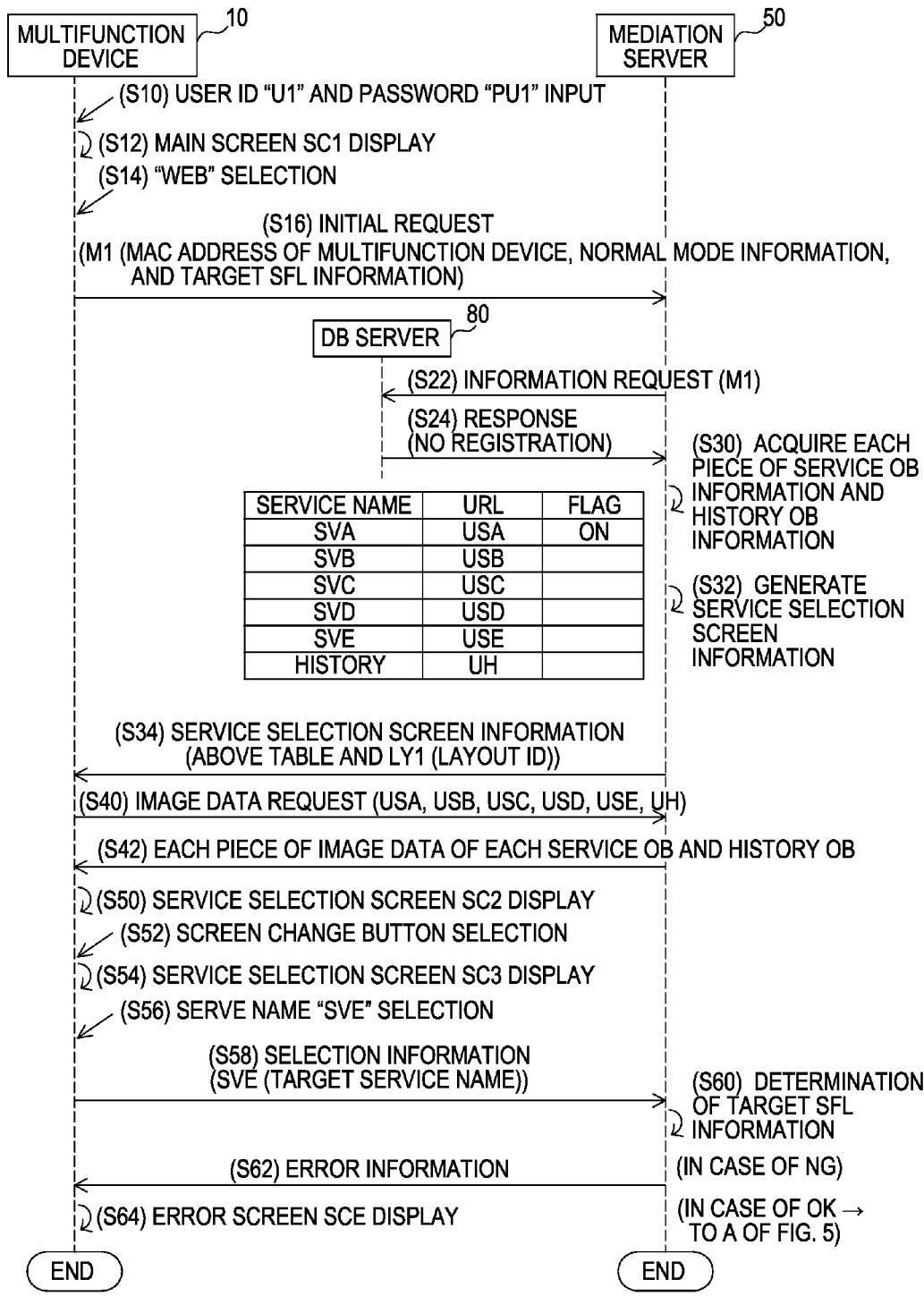

FIG. 10
(IN CASE OF DP)
IMAGE SELECTION SCREEN SC7
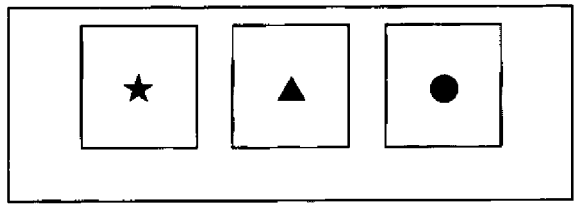
↓ IMAGE SELECTION
PRINT CONDITIONS SCREEN SC8
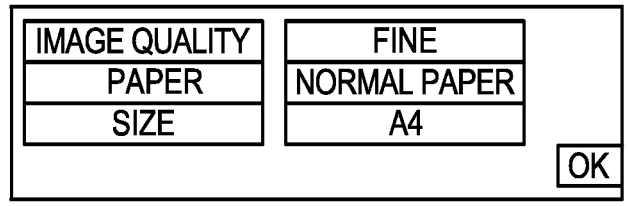
(IN CASE OF SU)
FD SELECTION SCREEN SC9
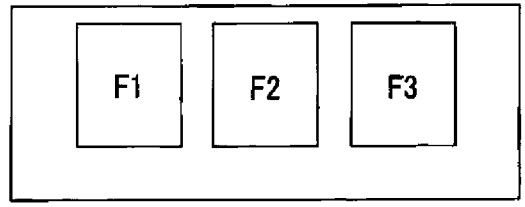
↓ FOLDER SELECTION
SCAN CONDITIONS SCREEN SC10
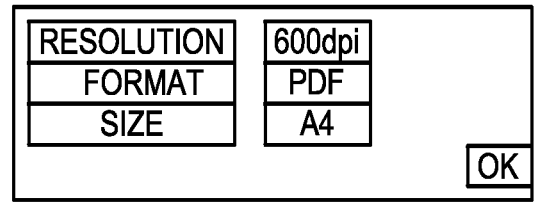

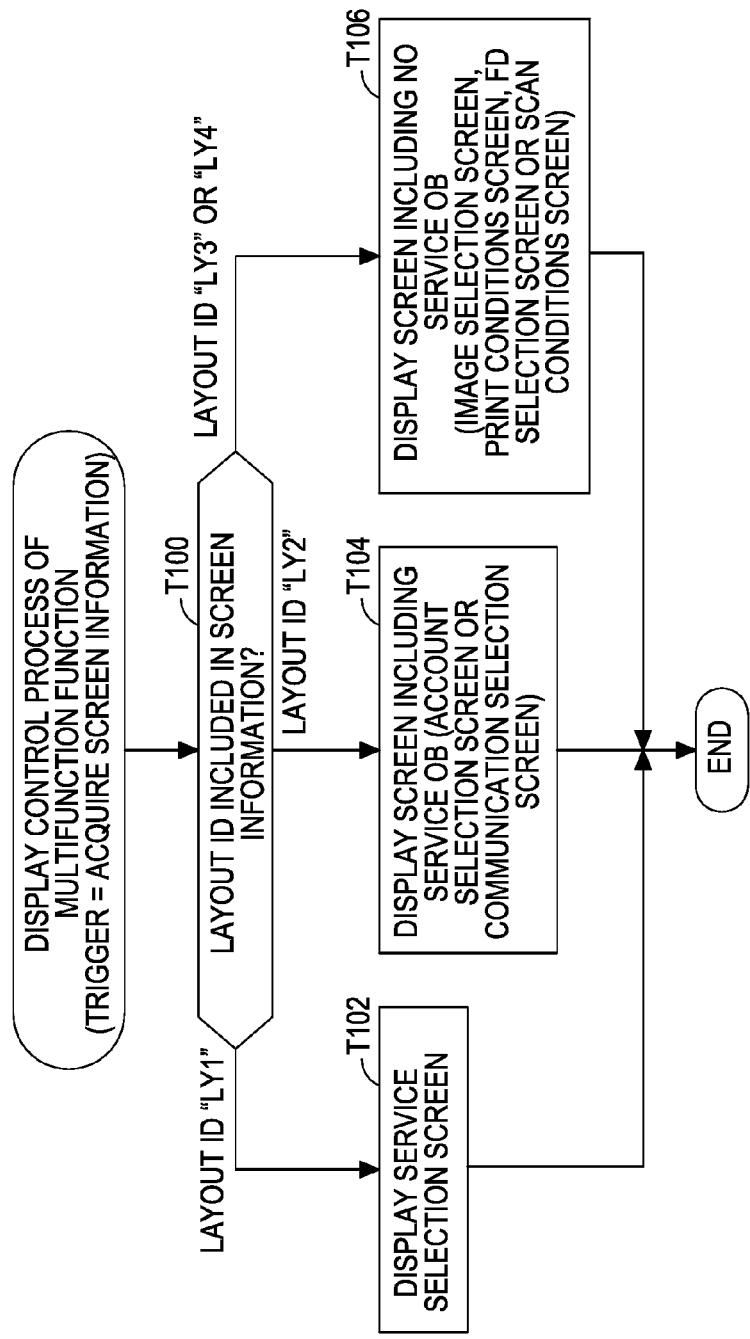

MEDIATION SERVER AND IMAGE PROCESSING DEVICE

CROSS REFERENCE TO RELATED APPLICATION

This application is based upon and claims the benefit of priority of Japanese Patent Application No. 2013-267695 filed on Dec. 25, 2013 the contents of which are incorporated herein by reference in its entirety.

BACKGROUND

The present specification discloses a mediation server for mediating provision of a plurality of services from one or more service providing servers to an image processing device, and the image processing device.

It is known a service linking system including a multifunction device and a relay device. When one of plural types of services is selected by a user, the multifunction device executes various communications with the relay device to receive the selected service from a service providing device. For example, the multifunction device sequentially acquires an album owner input UI display command and an album name selection UI display command from the relay device. Accordingly, the multifunction device sequentially displays an album owner input UI and an album name selection UI. Also, the user can execute each setting related to the selected service (for example, input of the album owner name or selection of the album name) in each UI.

SUMMARY

As described above, in the above technology, after one service is selected from among plural types of services by a user, a setting screen (for example, an album owner input UI) related to the selected service is displayed. However, when the setting screen is displayed, the user is likely to fail in remembering the selected service. In this case, the user does not know which setting related to a service in the setting screen to execute, and thus, is likely not to execute the setting appropriately. In the present specification, a technology enabling the user to easily execute settings is provided.

An aspect of the present disclosure provides the following arrangements:

A mediation server for mediating provision of a plurality of services from at least one service providing server to an image processing device, the mediation server comprising:
 a processor; and
 memory storing a computer executable program, when executed by the processor, causing the mediation server to execute:
 a selection screen information supply instruction of supplying, to the image processing device, service selection screen information which causes a display unit of the image processing device to display a service selection screen, the service selection screen being a screen for selecting a target service from among the plurality of services, and the service selection screen information including plural pieces of service-related information related to a plurality of service objects corresponding to the plurality of services so that the plurality of service objects are included in the service selection screen;
 a selection information acquisition instruction of acquiring selection information indicating the target service from the image processing device;
 a setting screen information supply instruction of supplying, to the image processing device, first setting screen information for causing the display unit to display a first setting screen after the selection information is acquired, the first setting screen being a screen for executing a first setting related to the target service, and the first setting screen information including target service-related information related to a target service object corresponding to the target service objects among the plural pieces of service-related information so that the target service object is included in the first setting screen; and
 a mediation communication execution instruction of executing mediation communication for mediating provision of the target service from a target service providing server among the at least one service providing server to the image processing device after the first setting screen information is supplied, the mediation communication including transmitting, to the image processing device, an execution instruction of target image processing related to the target service.

A non-transitory computer readable recording medium storing a program for a mediation server for mediating provision of a plurality of services from at least one service providing server to an image processing device, the program, when caused by a computer mounted on the mediation server, causing the mediation server to execute:
 a selection screen information supply instruction of supplying, to the image processing device, service selection screen information which causes a display unit of the image processing device to display a service selection screen, the service selection screen being a screen for selecting a target service from among the plurality of services, and the service selection screen information including plural pieces of service-related information related to a plurality of service objects corresponding to the plurality of services so that the plurality of service objects are included in the service selection screen;
 a selection information acquisition instruction of acquiring selection information indicating the target service from the image processing device;
 a setting screen information supply instruction of supplying, to the image processing device, first setting screen information for causing the display unit to display a first setting screen after the selection information is acquired, the first setting screen being a screen for executing a first setting related to the target service, and the first setting screen information including target service-related information related to a target service object corresponding to the target service objects among the plural pieces of service-related information so that the target service object is included in the first setting screen; and
 a mediation communication execution instruction of executing mediation communication for mediating provision of the target service from a target service providing server among the at least one service providing server to the image processing device after the first setting screen information is supplied, the mediation communication including transmitting, to the image processing device, an execution instruction of target image processing related to the target service.

An image processing device configured to communicate with a mediation server for mediating provision of a plurality of services from at least one service providing server to an image processing device, comprising:
 a display unit;
 a processor; and memory storing a computer executable program, when executed by the processor, causing the image processing device to execute:

a selection screen information acquisition instruction of acquiring service selection screen information from the mediation server, the service selection screen information including plural pieces of service-related information related to a plurality of service objects corresponding to the plurality of services;

a selection screen display control instruction of causing the display unit to display a service selection screen including the plurality of service objects using the service selection screen information;

a selection information supply instruction of supplying selection information indicating a target service to the mediation server when a user of the image processing device selects the target service from among the plurality of services in the service selection screen;

a setting screen information acquisition instruction of acquiring first setting screen information from the mediation server after the selection information is supplied, the first setting screen information including target service-related information related to a target service object corresponding to the target service;

a setting screen display control instruction of causing the display unit to display a first setting screen including the target service object using the first setting screen information, the first setting screen being a screen for executing a first setting related to the target service;

a specific communication execution instruction of executing specific communication for receiving the target service from a target service providing server among the at least one service providing server after the user executes the first setting in the first setting screen, the specific communication including receiving an execution instruction of target image processing related to the target service from the mediation server; and an image processing execution instruction of executing the target image processing when the execution instruction is received.

BRIEF DESCRIPTION OF DRAWINGS

FIG. 2 illustrates an example of data in a multifunction device of a first embodiment.

FIG. 3 illustrates an example of data in the mediation server.

FIG. 4 illustrates each process when "Web" is selected in a main screen.

FIG. 10 illustrates each screen displayed in a multifunction device.

FIG. 18 illustrates a flowchart of each process executed by a multifunction device of a second embodiment.

DESCRIPTION OF ILLUSTRATIVE EMBODIMENTS

First Embodiment

Configuration of System

Figure 1:
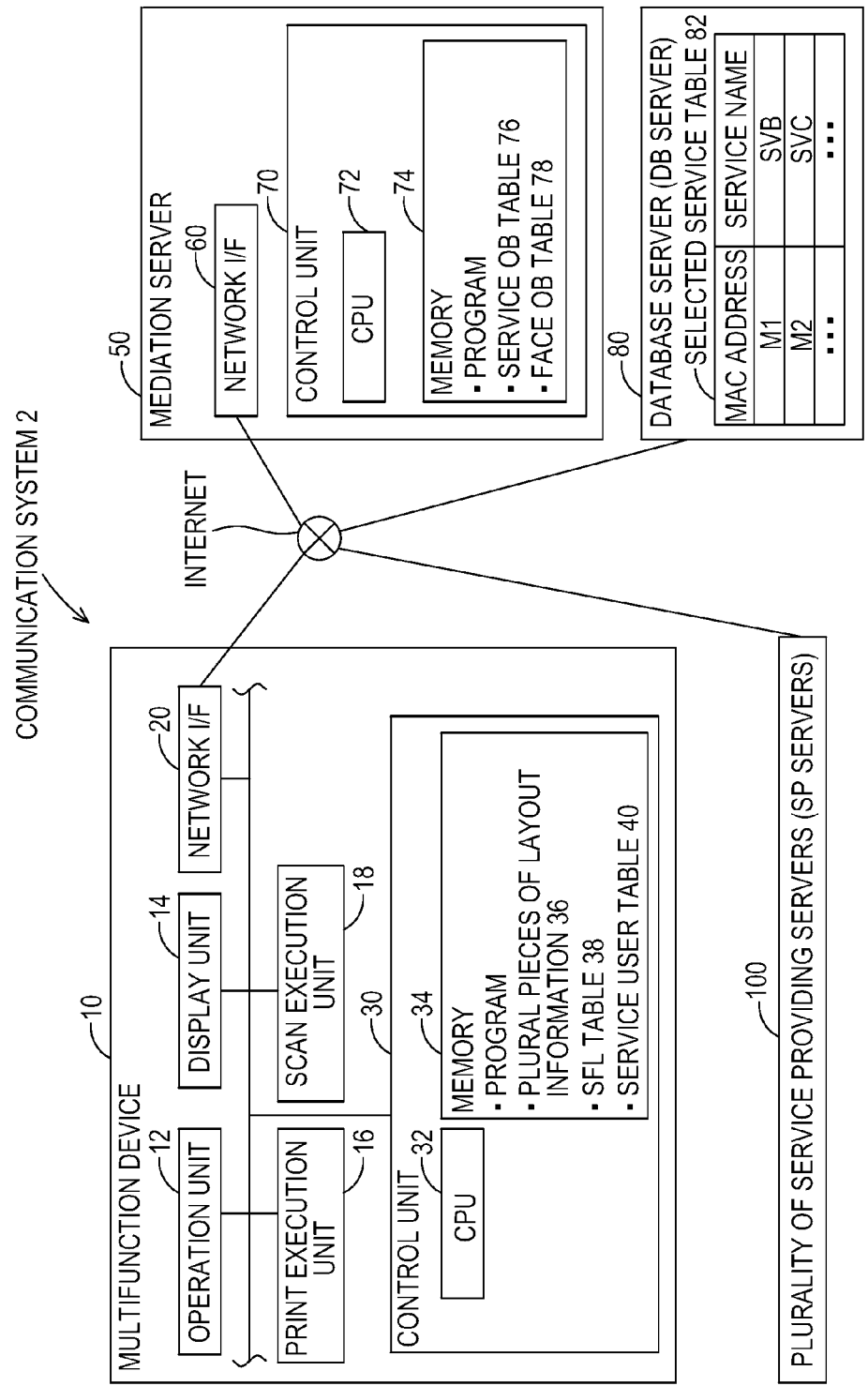
FIG. 1 illustrates a configuration of a communication system.

A communication system 2 includes a multifunction device 10, a mediation server 50, a database server (hereinafter referred to as a "DB server") 80, and a plurality of service providing servers (hereinafter referred to as "an SP server") 100, as illustrated in FIG. 1. These devices 10, 50, 80, and 100 are configured as separate entities.

Configuration of Multifunction Device 10

The multifunction device 10 can execute multiple functions, including a print function, a scan function, a copy function, a FAX function, and the like. The multifunction device 10 is a device connected to a local area network (LAN) (not illustrated), and is a peripheral device of other devices (for example, a personal computer (PC)) connected to the LAN. The multifunction device 10 includes an operation unit 12, a display unit 14, a print execution unit 16, a scan execution unit 18, a network I/F 20, and a control unit 30.

The operation unit 12 includes a plurality of keys. A user can input various instructions to the multifunction device 10 by operating the operation unit 12. The display unit 14 is a display for displaying various pieces of information. The display unit 14 functions as a so-called touch panel. That is, the display unit 14 also functions as an operation unit operated by the user. The print execution unit 16 includes a print mechanism in an ink jet scheme, a laser scheme, or the like. The scan execution unit 18 includes a scan mechanism, such as a CCD or a CIS. The network I/F 20 is an interface for connection to the LAN (not illustrated). The multifunction device 10 can access the Internet via the network I/F 20 (that is, via the LAN).

The control unit 30 includes a CPU 32 and a memory 34. The CPU 32 executes various processes according to a program stored in the memory 34. The memory 34 stores plural pieces of layout information 36, a secure function lock (SFL) table 38, and a service user table 40, in addition to the program.

Each of plural pieces of layout information 36 is information in which a layout ID (for example, "LY1") and layout data are associated, as illustrated in FIG. 2. The layout ID is identification information for identifying the layout data. The layout data is data indicating a layout of a screen to be displayed on the display unit 14. The plural pieces of layout information 36 is stored in the memory 34 in advance in a shipment stage of the multifunction device 10.

One or more pieces of SFL information are registered in the SFL table 38. Each piece of SFL information is information in which a user name, a password, print permission information, and scan permission information are associated. The user name is identification information for identifying the user of the multifunction device 10. The password is authentication information for authenticating the user. The print permission information indicates "OK" when the user is permitted to cause the multifunction device 10 to execute the print function, and indicates "NG" when the user is not permitted. The scan permission information indicates "OK" when the user is permitted to cause the multifunction device 10 to execute the scan function, and indicates "NG" when the user is not permitted. For example, a manager of the multifunction device 10 operates the operation unit 12 and registers each piece of SFL information for each user in the SFL table 38.

One or more pieces of service user information are registered in the service user table 40. Each piece of service user information is information in which a service name, an account name, a password, and a face ID are associated. The service name is a name of the service to be provided by each SP server 100 and, in other words, a server name of each SP server 100. The account name is identification information for identifying a user of the SP server 100. The password is authentication information for authenticating the user. The face ID is identification information for identifying a face object. Further, hereinafter, an object is referred to as an "OB."

For example, the user accesses any SP server 100 using any PC (not illustrated) and registers the account name and the password in the SP server 100. Then, for example, the user accesses the multifunction device 10 using the PC (not illustrated) and registers the service name of the SP server 100, the account name, the password, and the face ID in the service user table 40. Accordingly, one piece of service user information is registered in the service user table 40. Further, the user can access the mediation server 50 (that is, access each piece of image data in the face OB table 78 of FIG. 3 to be described below) using the PC (not illustrated) and display each face OB on the PC. Accordingly, the user can ascertain each face ID corresponding to each face OB and register a face ID corresponding to a desired face OB in the service user table 40.

Configuration of Mediation Server 50

The mediation server 50 of FIG. 1 is a server provided by the vendor of the multifunction device 10. The mediation server 50 is a server that mediates provision of the service from each SP server 100 to the multifunction device 10. Specifically, the mediation server 50 can execute communication with each SP server 100 according to each application program interface (API) corresponding to each SP server 100.

The mediation server 50 includes a network I/F 60, and a control unit 70. The mediation server 50 can access the Internet via the network I/F 60. The control unit 70 includes a CPU 72 and a memory 74. The CPU 72 executes various processes according to a program stored in the memory 74.

The program in the memory 74 includes a plurality of APIs corresponding to the plurality of SP servers 100. Each of the plurality of APIs is a program for communicating with the SP server corresponding to the API and executing data processing. The memory 74 stores a service OB table 76 and a face OB table 78, in addition to the program. The information within the respective tables 76 and 78 is registered by the manager of the mediation server 50 (that is, the vendor of the multifunction device 10) in advance.

Plural pieces of service OB information, and history OB information (that is, information in a bottom column of FIG. 3) are registered in the service OB table 76, as illustrated in FIG. 3. Each piece of service OB information is information in which a uniform resource locator (URL), a service name, and image data are associated. The service name is a name of the service provided by each SP server 100. The URL is locational information indicating a location (that is, a location within the mediation server 50) of the image data indicating the service OB. The image data is data indicating the service OB (that is, an image indicating the service).

The history OB information is information in which a URL, a service name, and image data are associated, as well. However, the history OB information is information not related to each service provided by each SP server 100, and is information related to a history supply service that can be provided by the mediation server 50. The history supply service is a service for supplying history information indicating the service of the SP server supported by a device sold by a vendor of the multifunction device 10 and a time when the service of the SP server is supported, to the device.

Plural pieces of face OB information are registered in the face OB table 78. Each piece of face OB information is information in which a URL, a face ID, and image data are associated. The URL is locational information indicating a location of image data indicating the face OB (that is, a location within the mediation server 50). The face ID is identification information for identifying the face OB (that is, an image representing the face). The image data is data indicating the face OB.

Configuration of DB Server 80

The DB server 80 of FIG. 1 is a server provided by the vendor of the multifunction device 10. The DB server 80 can communicate with the mediation server 50 through the Internet. The DB server 80 stores the selected service table 82. Information in the selected service table 82 is registered according to an instruction from the mediation server 50.

Plural pieces of selected service information are registered in the selected service table 82. Each selected service information is information in which an MAC address and a service name are associated. The MAC address is identification information assigned to the multifunction device (for example, 10) in advance. In this embodiment, the MAC address of the multifunction device 10 is "M1." The service name is a service name selected in the past by the user of the multifunction device.

Configuration of the SP Server 100

The plurality of SP servers 100 are, for example, servers (that is, cloud servers) having respective service names such as "Evernote (registered trademark)," "Google (registered trademark) Docs," "PICASA (registered trademark)," and "Facebook (registered trademark)." Each SP server 100 provides the service corresponding to the SP server to the communication device (for example, the multifunction device 10) through the Internet. Each SP server 100 can provide various services to the communication device by executing various functions. For example, there is an SP server that can execute a function of acquiring image data from the communication device and storing the image data (hereinafter referred to as an "image data storage function"), and there is an SP server that can execute a function of supplying image data to the communication device (hereinafter referred to as an "image data supplying function"). In this embodiment, all of the plurality of SP servers 100 for which the mediation server 50 can mediate provision of the services can execute the image data supplying function. However, only some of the plurality of SP servers 100 can execute the image data storage function.

Each Process Executed by Respective Devices 10 and 50 or the Like; FIG. 4

In this embodiment, it is assumed that the multifunction device 10 receives a service from the service providing server 100 for executing download print or scan upload. The download print is downloading image data from the service providing server 100 and executing printing of an image represented by the image data. In this case, the service providing server 100 executes the image data supplying function. Further, the scan upload is generating the image data through scanning of a document and uploading the image data to the service providing server 100. In this case, the service providing server 100 executes the image data storage function. Hereinafter, the download print and the scan upload may be referred to as "DP" (Download Print) and "SU" (Scan Upload).

As illustrated in FIG. 4, the user inputs a user ID "U1" and a password "PU1" to the multifunction device 10 in S10. Further, the user may operate the operation unit 12 to input information to the multifunction device 10 or may input information to the multifunction device 10 using the touch panel of the display unit 14. Hereinafter, the operation of the user may also be executed by either the operation unit 12 or the touch panel of the display unit 14.

Figure 9:
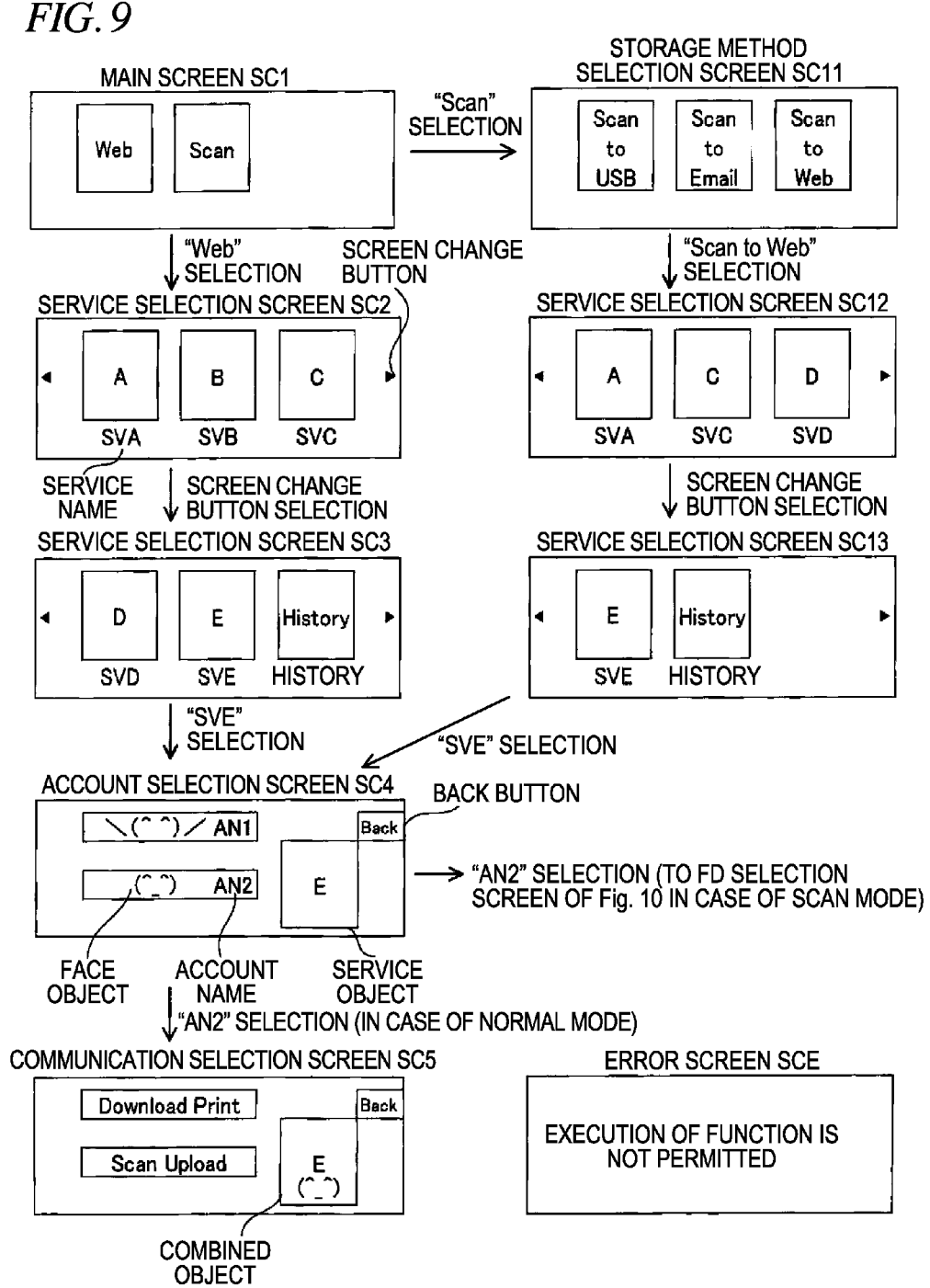
FIG. 9 illustrates each screen displayed in a multifunction device.

In S12, the CPU 32 of the multifunction device 10 supplies the display data stored in the memory 34 in advance to the display unit 14 and causes the display unit 14 to display a main screen SC1 of FIG. 9. The main screen SC1 includes an object indicating "Web" and an object indicating "Scan." The object indicating "Web" is an object indicating execution of connection to the Internet. The object indicating "Scan" is an object indicating execution of the scan function. Further, the main screen SC1 may include other objects indicating execution of other functions (for example, an object indicating "Copy" and an object indicating "FAX").

In S14 of FIG. 4, the user selects the object indicating "Web" in the main screen SC1. In this case, the CPU 32 of the multifunction device 10 supplies an initial request to the mediation server 50 in S16. The initial request is a command for requesting screen information related to the connection to the Internet. The initial request includes an MAC address "M1" of the multifunction device 10, normal mode information, and target SFL information. The normal mode information is information included in the initial request when the object indicating "Web" is selected in the main screen SC1. The target SFL information is information (for example, print permission information "OK" and scan permission information "OK") associated with the user ID "U1" and the password "PU1" input in S10 among the one or more pieces of SFL information registered in the SFL table 38 within the memory 34 (see FIG. 2).

When the CPU 72 of the mediation server 50 acquires the initial request from the multifunction device 10, the CPU 72 supplies an information request including the MAC address "M1" within the initial request to the DB server 80 in S22.

When the DB server 80 acquires the information request from the mediation server 50, the DB server 80 determines whether the MAC address "M1" within the information request is registered in the selected service table 82 (see FIG. 1). In the example of FIG. 4, the DB server 80 determines that the MAC address "M1" is not registered and, as a result, supplies a response indicating "No registration" to the mediation server 50 in S24.

When the CPU 72 of the mediation server 50 acquires the response from the DB server 80, the CPU 72 acquires each piece of service OB information and the history OB information from the service OB table 76 (see FIG. 3) within the memory 74 in S30. Also, the CPU 72 generates service selection screen information in S32. Then, the CPU 72 supplies the service selection screen information to the multifunction device 10 in S34. The service selection screen information is information for causing the multifunction device 10 to display two or more service selection screens (see SC2 and SC3 in FIG. 9), and is specifically generated as follows.

The CPU 72 of the mediation server 50 first generates the table of FIG. 4. In this table, a service name, a URL and a flag are associated. The CPU 72 describes each service name and each URL included in each piece of service OB information in the table in the same order as the arrangement order of the respective pieces of service OB information within the service OB table 76 (see FIG. 3). Then, the CPU 72 describes the service name "history" and the URL "UH" included in the history OB information in the table (that is, describes them in the bottom column). Also, the CPU 72 describes "ON" as a flag in a top column of the tables since the response of S24 indicates "No registration." The flag "ON" is information associated with only any one service name within the table, and is information for instructing the multifunction device 10 to first display a screen including the service name. Further, when the response of S24 indicates the service name rather than "No registration," the CPU 72 describes the flag "ON" in association with the service name. Further, the CPU 72 understands the plurality of layout IDs "LY1" to "LY4" (see FIG. 2) used in the multifunction device 10 in advance, and determines one layout ID "LY1" among these layout IDs. Accordingly, the CPU 72 can generate service selection screen information including the table of FIG. 4 and the layout ID "LY1."

When the CPU 32 of the multifunction device 10 acquires the service selection screen information from the mediation server 50, the CPU 32 supplies an image data request including six URLs within the service selection screen information to the mediation server 50 in S40.

When the CPU 72 of the mediation server 50 acquires the image data request from the multifunction device 10, the CPU 72 acquires the six pieces of image data identified by the six URLs within the image data request from the service OB table 76 (see FIG. 3). Also, the CPU 72 supplies the six pieces of image data to the multifunction device 10 in S42.

When the CPU 32 of the multifunction device 10 acquires the six pieces of image data from the mediation server 50, the CPU 32 generates two pieces of display data indicating two service selection screens (see SC2 and SC3 in FIG. 9) in S50. Specifically, the CPU 32 acquires layout data identified by the layout ID "LY1" within the service selection screen information from among the plural pieces of layout information 36 in the memory 34. Since the acquired layout data includes three areas A1 to A3 (see FIG. 2), the CPU 32 acquires three service names "SVA," "SVB" and "SVC" sequentially from the top column of the table within the service selection screen information and adds the three service names below the three areas A1 to A3. The CPU 32 also adds the three pieces of image data corresponding to the three service names among the six pieces of acquired image data to the three areas A1 to A3. Accordingly, the first display data is completed.

Similarly, the CPU 32 generates second display data using the same layout data as the acquired layout data. That is, the CPU 32 acquires three remaining service names "SVD," "SVE" and "history" from the table within the service selection screen information, adds the three service names below the three areas A1 to A3 and also adds the three pieces of remaining image data among the six pieces of acquired image data to the three areas A1 to A3. Accordingly, the second display data is completed.

Since the flag "ON" is described in association with the service name "SVA" in the table within the service selection screen information, the CPU 32 determines that a service selection screen including the service name "SVA" is to be displayed first. As a result, the CPU 32 first supplies the first display data to the display unit 14, and causes the display unit 14 to display a service selection screen SC2 of FIG. 9. The service selection screen SC2 includes three service OBs indicating figures "A" and the like, three service names indicating "SVA" and the like, and screen change buttons.

In S52 of FIG. 4, the user selects the screen change button in the service selection screen SC2. In this case, the CPU 32 of the multifunction device 10 supplies the second display data to the display unit 14 and causes the display unit 14 to display a service selection screen SC3 of FIG. 9 in S54. The service selection screen SC3 includes two service OBs indicating a figure "D" and the like, one history OB indicating a figure "History," three service names, and a screen change button. When the user selects the screen change button in the service selection screen SC3, the CPU 32 supplies the first display data to the display unit 14 again and causes the display unit 14 to display the service selection screen SC2 again.

In this embodiment, the mediation server 50 supplies the service selection screen information including the layout ID "LY1" and the plurality of service names to the multifunction device 10, as described above (see S34). Accordingly, the multifunction device 10 displays the service selection screens SC2 and SC3 using the layout data identified by the layout ID "LY1." Alternatively, for example, it is assumed that the mediation server 50 adopts a configuration in which display data indicating the service selection screen (for example, the first and second display data generated by the multifunction device 10 in S50) is generated and the display data is supplied to the multifunction device 10 (hereinafter referred to as a "configuration of a comparative example").

In the configuration of the comparative example, since the layout data in the multifunction device 10 includes the three areas A1 to A3, the mediation server 50, for example, should generate the first display data indicating one service selection screen (for example, SC2) including three service OBs and supply the first display data to the multifunction device 10. Further, for example, a situation in which there is a multifunction device that is a model different from the multifunction device 10 (hereinafter referred to as a "specific multifunction device"), and in the specific multifunction device, the layout data identified by the layout ID "LY1" includes four areas is assumed. In this case, the mediation server 50 should generate display data indicating one service selection screen including four service OBs, and supply the display data to the specific multifunction device. Thus, in the configuration of the comparative example, since it is necessary for the mediation server 50 to generate different display data according to the model of the multifunction device, a load on the mediation server 50 is high. On the other hand, in this embodiment, the mediation server 50 may supply the same service selection screen information to the multifunction device 10 and the specific multifunction device. Accordingly, for example, the multifunction device 10 generates display data indicating one service selection screen SC2 including three service OBs, and the specific multifunction device generates display data indicating one service selection screen including four service OBs. That is, the mediation server 50 does not generate different display data according to the model of the multifunction device. Therefore, the load on the mediation server 50 is lower than that in the configuration of the comparative example.

In S56 of FIG. 4, the user selects a service having the service name "SVE" by selecting the service OB indicating the figure "E" in the service selection screen SC3. Further, the service name (that is, "SVE") selected in S56, the service having the service name, and the SP server providing the service are hereinafter referred to as a "target service name," a "target service," and a "target SP server," respectively. In S58, the CPU 32 of the multifunction device 10 supplies selection information including the target service name "SVE" to the mediation server 50.

In S60, the CPU 72 of the mediation server 50 executes a determination of the target SFL information acquired in S16 and determines "OK" or "NG" as a determination result. The determination result "OK" of S60 means that the multifunction device 10 can execute at least one of the download print (that is, the DP) and the scan upload (that is, SU) based on the target SFL information and the target service. Further, the determination result "NG" of S60 means that the multifunction device 10 can execute neither the DP nor the SU. When either the print permission information or the scan permission information within the target SFL information indicates "NG," the CPU 72 determines "NG" as a determination result.

As described above, the plurality of SP servers 100 can all execute the image data supplying function in this embodiment, whereas only some of the plurality of SP servers 100 can execute the image data storage function. Therefore, the target SP server 100 is capable of executing at least the image data supplying function. When the print permission information within the target SFL information indicates "OK," the CPU 72 determines "OK" as a determination result. This is because the user is allowed to execute the print function and the target SP server 100 is capable of executing at least the image data supplying function, and thus, the multifunction device 10 can execute at least the DP.

Further, when the print permission information within the target SFL information is "NG" and the scan permission information within the target SFL information is "OK," the CPU 72 determines whether the object SP server 100 is capable of executing the image data storage function. The determination is executed based on information (not illustrated) on each SP server 100 stored in the memory 74 in advance. When the CPU 72 determines that the target SP server can execute the image data storage function, the CPU 72 determines "OK" as a determination result. This is because the user is allowed to execute the scan function and the target SP server 100 is capable of executing the image data storage function, and thus, the multifunction device 10 can execute the SU. On the other hand, when the CPU 72 determines that the target SP server is incapable of executing the image data storage function, the CPU 72 determines "NG" as a determination result.

When the CPU 72 of the mediation server 50 determines "NG" as the determination result of S60, the CPU 72 supplies error information to the multifunction device 10 in S62. In this case, the CPU 72 ends the process according to the initial request of S16 without supplying each piece of screen information to be described below (see, for example, S82 and S106 of FIG. 5) to the multifunction device 10.

When the CPU 32 of the multifunction device 10 acquires the error information from the mediation server 50, the CPU 32 supplies display data stored in the memory 34 in advance to the display unit 14 and causes the display unit 14 to display an error screen SCE of FIG. 9 in S64. Accordingly, the user can understand that it is not possible to cause the multifunction device 10 to execute the DP or the SU.

Figure 5:
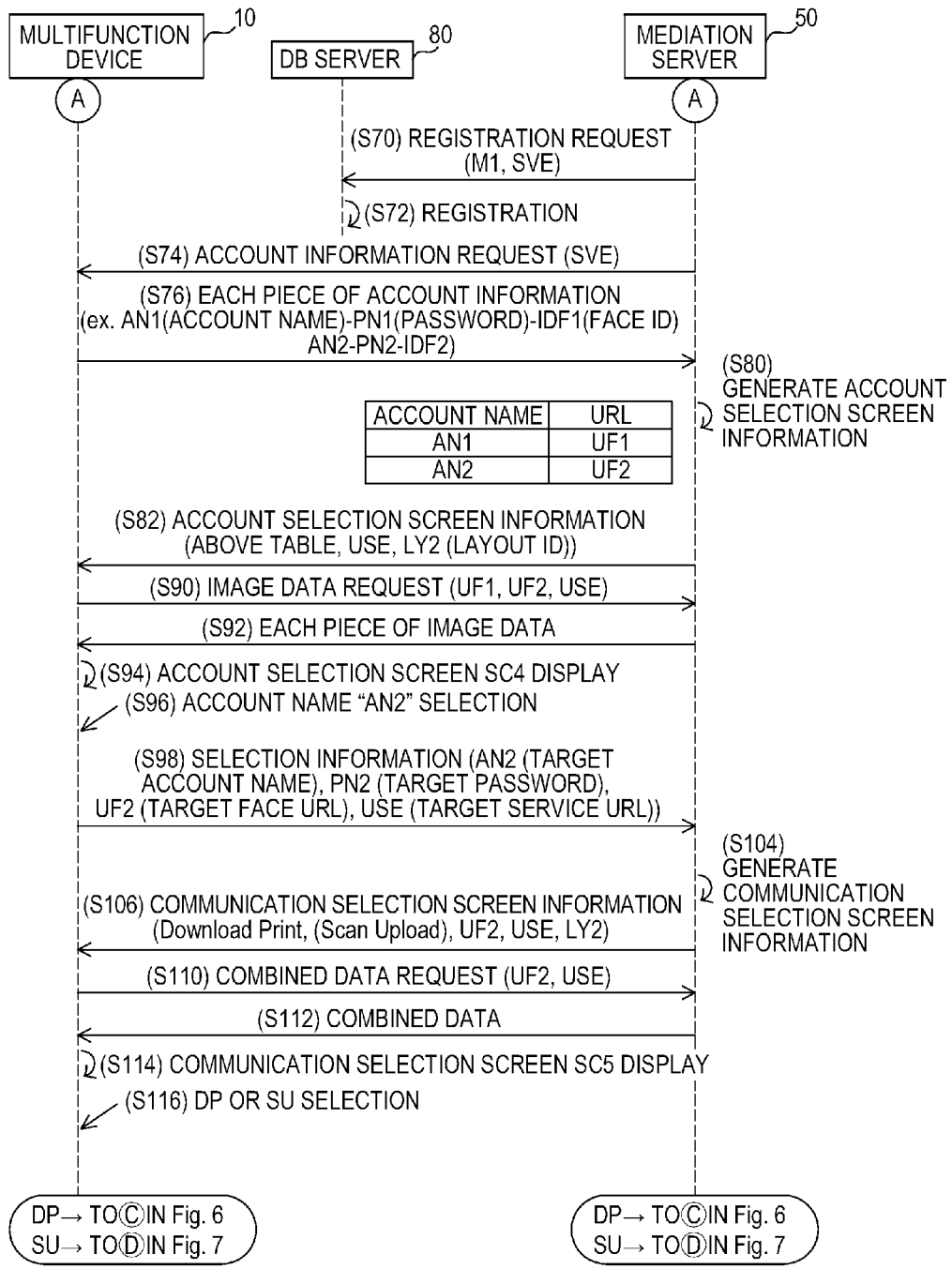
FIG. 5 illustrates each process when a determination result of target SFL information is OK.

Case in which Determination Result of S60 of FIG. 4 is "OK"; FIG. 5

As illustrated in FIG. 5, when the CPU 72 of the mediation server 50 determines "OK" as a determination result of S60 of FIG. 4, the CPU 72 of the mediation server 50 supplies a registration request to the DB server 80 in S70. The registration request includes the MAC address "M1" of the multifunction device 10, and the target service name "SVE."

When the DB server 80 acquires the registration request from the mediation server 50, the DB server 80 determines whether the MAC address "M1" within the registration request is registered in the selected service table 82 (see FIG. 1). When the DB server 80 determines that the MAC address "M1" is not registered, the DB server 80 registers new selection information in the selected service table 82 in S72. The new selection information is information in which the MAC address "M1" and the target service name "SVE" are associated. Further, when the DB server 80 determines that the MAC address "M1" is registered, the DB server 80 describes the target service name "SVE" in the selected service table 82 in place of a service name associated with the MAC address "M1" in S72.

In S74, the CPU 72 of the mediation server 50 supplies an account information request including the target service name "SVE" to the multifunction device 10.

When the CPU 32 of the multifunction device 10 acquires the account information request from the mediation server 50, the CPU 32 acquires one or more pieces of account information (that is, an account name, a password, and a face ID) associated with the target service name "SVE" within the account information request from the service user table 40 (see FIG. 2). Also, the CPU 32 supplies the one or more pieces of acquired account information to the mediation server 50 in S76.

When the CPU 72 of the mediation server 50 acquires the one or more pieces of account information from the multifunction device 10, the CPU 72 generates account selection screen information in S80. Then, the CPU 72 supplies the account selection screen information to the multifunction device 10 in S82. The account selection screen information is information for causing the multifunction device 10 to display an account selection screen (see SC4 of FIG. 9) and is specifically generated as follows.

The CPU 72 of the mediation server 50 first generates a table of FIG. 5. In this table, the account name and the URL are associated. The CPU 72 executes the following process using one of the one or more pieces of account information to generate the table. That is, the CPU 72 acquires a URL associated with the face ID within the one piece of account information from the face OB table 78 (see FIG. 3). Also, the CPU 72 describes the account name and the acquired URL within the one piece of account information in the table in association with each other. The CPU 72 similarly executes the process for other account information. Accordingly, the table of FIG. 5 is completed. Further, the CPU 72 acquires an URL "USE" associated with the target service name "SVE" (hereinafter referred to as a "target service URL") from the service OB table 76 (see FIG. 3). Further, the CPU 72 determines one layout ID "LY2" (see FIG. 2). Accordingly, the CPU 72 can generate the account selection screen information including the table of FIG. 5, the target service URL "USE," and the layout ID "LY2."

When the CPU 32 of the multifunction device 10 acquires the account selection screen information from the mediation server 50, the CPU 32 supplies an image data request including three URLs "UF1", "UF2," and "USE" within the account selection screen information to the mediation server 50 in S90.

When the CPU 72 of the mediation server 50 acquires the image data request from the multifunction device 10, the CPU 72 acquires three pieces of image data identified by the three URLs "UF1" "UF2," and "USE" within the image data request from the service OB table 76 and the face OB table 78 (see FIG. 3). Also, the CPU 72 supplies the three pieces of image data to the multifunction device 10 in S92.

When the CPU 32 of the multifunction device 10 acquires the three pieces of image data from the mediation server 50, the CPU 32 generates display data indicating the account selection screen (see SC4 of FIG. 9) in S94. Specifically, the CPU 32 acquires the layout data identified by the layout ID "LY2" from the memory 34. The acquired layout data includes a plurality of areas A4, A5, and A6, as illustrated in FIG. 2. The CPU 32 describes two account names "AN1" and "AN2" included in the table within the account selection screen information in the two areas A4 and A5. The CPU 32 also describes two pieces of image data indicating the face OB among the three pieces of acquired image data in the two areas A4 and A5. Further, the CPU 32 describes one piece of image data indicating the service OB among the three pieces of acquired image data in the area A6. Accordingly, the display data is completed. The CPU 32 supplies the display data to the display unit 14 and causes the display unit 14 to display the account selection screen SC4 of FIG. 9. In this example, the account selection screen SC4 includes two face OBs, two account names, the service OB, and the back button.

In S96 of FIG. 5, the user selects the account name "AN2" corresponding to the user in the account selection screen SC4. Since the account selection screen SC4 includes the service OB corresponding to the target service, the user can easily understand the target service when viewing the account selection screen SC4. Therefore, the user can appropriately select the user's account name "AN2" for receiving the target service. Further, since each face OB is arranged near each account name in the account selection screen SC4, the user can appropriately select the user's account name "AN2" which is arranged near the user's face OB.

In S98, the CPU 32 of the multifunction device 10 supplies selection information including the target account name "AN2," the target password "PN2," the target face URL "UF2," and the target service URL "USE" to the mediation server 50. The target account name "AN2" is an account name selected in S96. The target password "PN2" is a password associated with target account name "PN2" in the service user table 40 (see FIG. 2). The target face URL "UF2" is a URL associated with the target account name "PN2" in the table of FIG. 5 within the account selection screen information.

When the CPU 72 of the mediation server 50 acquires the selection information from the multifunction device 10, the CPU 72 generates communication selection screen information in S102. Then, the CPU 72 supplies the communication selection screen information to the multifunction device 10 in S106. The communication selection screen information is information for causing the display unit 14 of the multifunction device 10 to display a communication selection screen (see SC5 of FIG. 9) and, specifically, is generated as follows.

The CPU 72 of the mediation server 50 determines one layout ID "LY2" (see FIG. 2). Also, the CPU 72 generates communication selection screen information including at least a character string "Download Print" indicating the DP, the target face URL "UF2" within the selection information of S98, the target service URL "USE" within the selection information of S98, and the layout ID "LY2." Further, when the target SP server 100 is capable of executing the image data storage function, the CPU 72 generates communication selection screen information further including a character string "Scan Upload" indicating the SU. However, when the target SP server 100 is incapable of executing the image data storage function, the CPU 72 generates communication selection screen information not including character string "Scan Upload" indicating the SU. This is because the target SP server 100 is incapable of executing the image data storage function, and thus, the multifunction device 10 is incapable of executing the SU.

When the CPU 32 of the multifunction device 10 acquires the communication selection screen information from the mediation server 50, the CPU 32 supplies a combined data request including two URLs "UF2" and "USE" within the communication selection screen information to the mediation server 50 in S110.

When the CPU 72 of the mediation server 50 acquires the combined data request from the multifunction device 10, the CPU 72 acquires two pieces of image data identified by the two URLs "UF2" and "USE" within the combined data request from the service OB table 76 and the face OB table 78 (see FIG. 3). Also, the CPU 72 generates the combined data indicating a combined OB by combining the two pieces of image data. Then, the CPU 72 supplies the combined data to the multifunction device 10 in S112.

When the CPU 32 of the multifunction device 10 acquires the combined data from the mediation server 50, the CPU 32 generates display data indicating the communication selection screen (see SC5 of FIG. 9) in S114. Specifically, the CPU 32 acquires the layout data (see FIG. 2) identified by the layout ID "LY2" from the memory 34. The CPU 32 describes a character string "Download Print" within the communication selection screen information in the area A4. Further, when a character string "Scan Upload" is included in the communication selection screen information, the CPU 32 describes the character string "Scan Upload" in the area A5. However, when the character string "Scan Upload" is not included in the communication selection screen information, the CPU 32 describes no character string in the area A5. Further, the CPU 32 describes the acquired combined data in the area A6. Accordingly, the display data is completed. The CPU 32 supplies the display data to the display unit 14 and causes the display unit 14 to display the communication selection screen SC5 of FIG. 9. The communication selection screen SC5 includes the character string "Download Print," the character string "Scan Upload," the combined OB, and the back button. The communication selection screen SC5 is a screen for selecting any one of image data downloading communication and image data uploading communication.

In S116 of FIG. 5, the user selects the DP or the SU in the communication selection screen SC5. Hereinafter, communication (that is, the DP or the SU) selected in the communication selection screen SC5 is referred to as "target communication." Since the communication selection screen SC5 includes the combined OB, and the combined OB includes the service OB corresponding to the target service (see FIG. 9), the user can easily understand the target service when viewing the communication selection screen SC5. Therefore, the user can select the target communication while recognizing the target service. Further, the user can confirm that the face OB included in the combined OB is the face OB of the user. That is, the user can confirm whether the target account name "AN2" of the user is selected in the account selection screen SC4 (see FIG. 9). When the DP is selected in the communication selection screen SC5, each process of FIG. 6 is executed, and when the SU is selected, each process of FIG. 7 is executed.

Case in which DP is Selected in S116 of FIG. 5; FIG. 6

Figure 6:
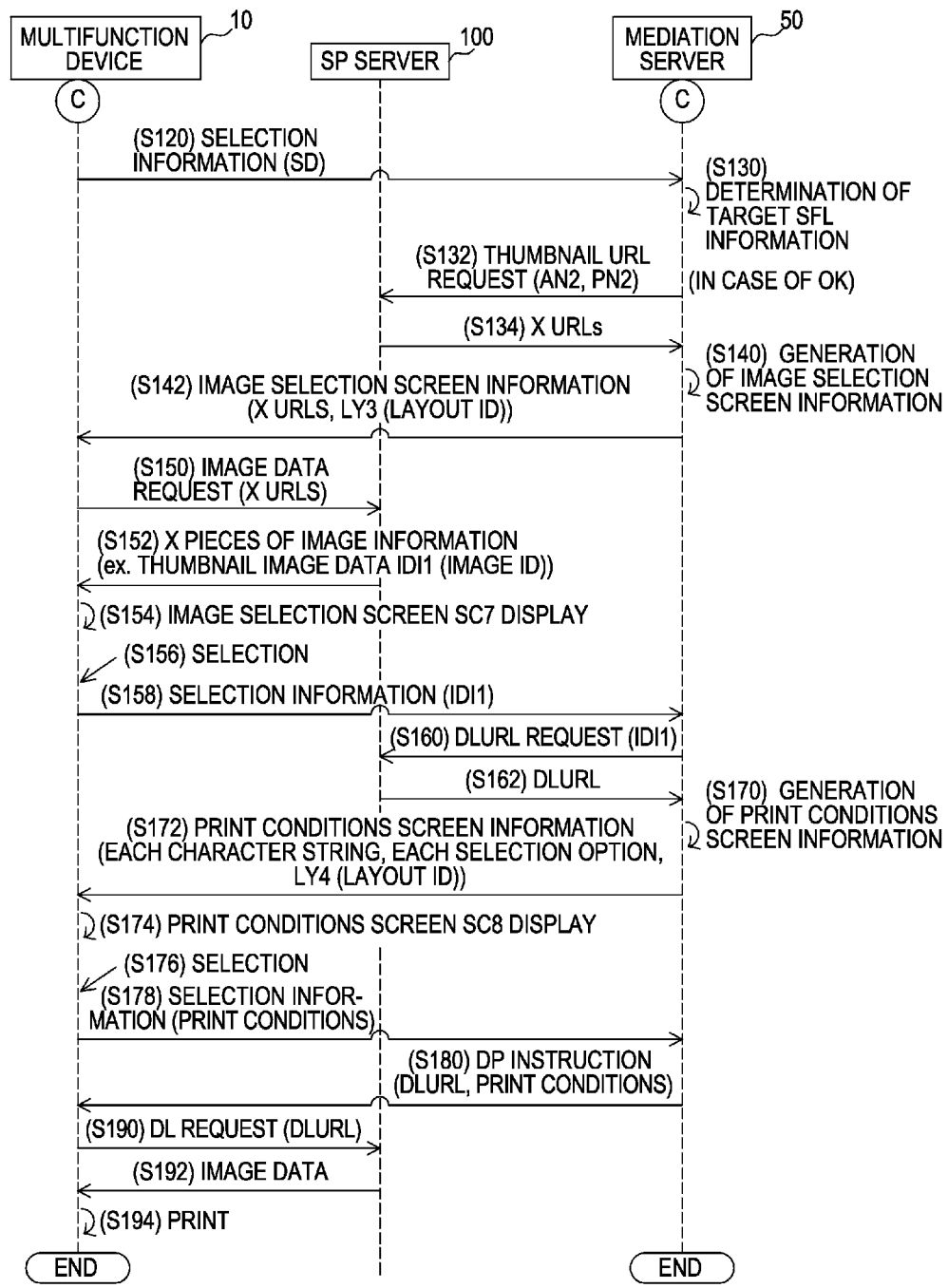
FIG. 6 illustrates each process when download print (that is, DP) is selected.
Figure 7:
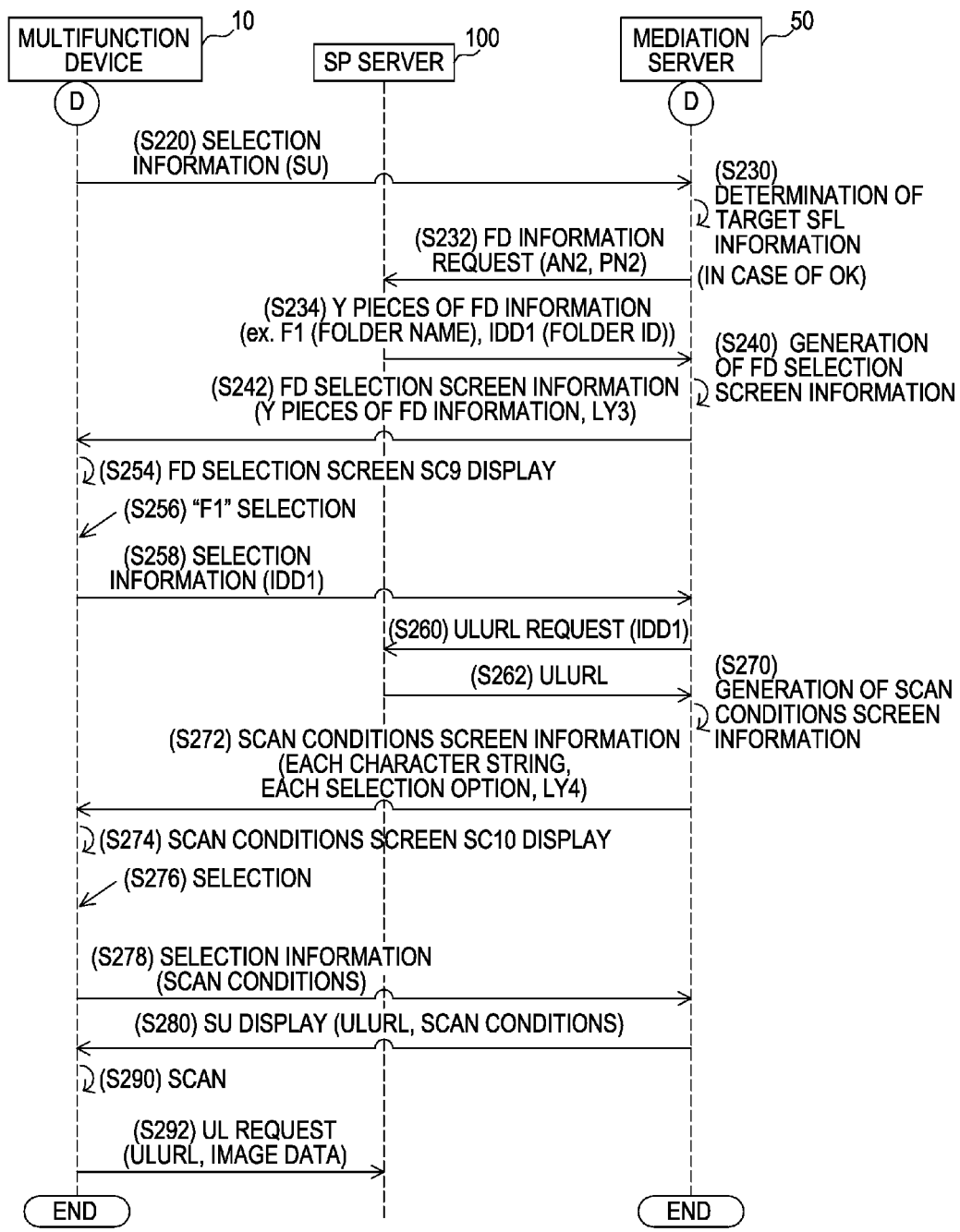
FIG. 7 illustrates each process when scan upload (that is, SU) is selected.

When the DP is selected in S116 of FIG. 5, the CPU 32 of the multifunction device 10 supplies selection information indicating the DP as the target communication to the mediation server 50 in S120, as illustrated in FIG. 6.

When the CPU 72 of the mediation server 50 acquires the selection information from the multifunction device 10, the CPU 72 executes a determination of the target SFL information (see S16 of FIG. 4) and determines "OK" or "NG" as a determination result in S130. The determination result of S130 indicates whether the multifunction device 10 is capable of executing the DP based on the target SFL information. When the print permission information within the target SFL information indicates "NG," the CPU 72 determines "NG" as a determination result. In this case, although not illustrated, the CPU 72 supplies error information for causing display of an error screen SCE of FIG. 9 to the multifunction device 10. That is, the CPU 72 ends the process according to the initial request of S16 in FIG. 4 without supplying each piece of screen information to be described below (see, for example, S142 and S172) to the multifunction device 10. On the other hand, when the print permission information within the target SFL information indicates "OK," the CPU 72 determines "OK" as a determination result. In this case, the CPU 72 supplies a thumbnail URL request including the target account name "AN2" and the target password "PN2" (see S98 of FIG. 5) to the target SP server 100 in S132.

When the target SP server 100 acquires the thumbnail URL request from the mediation server 50, the target SP server 100 executes authentication using the target account name "AN2" and the target password "PN2" within the thumbnail URL request. Further, when the mediation server 50 or the multifunction device 10 supplies a request (for example, S150 of FIG. 6 and S232 of FIG. 7) to the SP server 100, the object account name "AN2" and the object password "PN2" are included in the request, and the authentication is executed by the object SP server 100. However, a description of the authentication will be hereinafter omitted. When the authentication succeeds, the target SP server 100 supplies X URLs indicating locations of X pieces of thumbnail image data (X is an integer equal to or more than 1) to the mediation server 50 in S134. The X pieces of thumbnail image data are obtained by reducing X pieces of image data stored in the target SP server 100 in association with the target account name "AN2."

When the CPU 72 of the mediation server 50 acquires the X URLs from the SP server 100, the CPU 72 generates image selection screen information in S140. The image selection screen information is information for causing the multifunction device 10 to display an image selection screen (see SC7 of FIG. 10). Specifically, the CPU 72 determines one layout ID "LY3" (see FIG. 2) and generates image selection screen information including the X URLs of S134 and the layout ID "LY3." However, the layout data identified by the layout ID "LY3" includes the areas A7 to A9 (see FIG. 2) for displaying thumbnail images, but does not include an area for displaying the service OB corresponding to the target service name "SVE." Thus, since there is no space for displaying the service OB, the CPU 72 generates image selection screen information not including the target service URL "USE." Then, the CPU 72 supplies the image selection screen information to the multifunction device 10 in S142.

When the CPU 32 of the multifunction device 10 acquires the image selection screen information from the mediation server 50, the CPU 32 supplies an image data request including X URLs within the image selection screen information to the target SP server 100 in S150.

When the target SP server 100 acquires the image data request from the multifunction device 10, the target SP server 100 supplies X pieces of image information to the multifunction device 10 in S152. Each of the X pieces of image information is information in which the thumbnail image data and the image ID are associated. The thumbnail image data is data identified by the URL within the image data request. The image ID is identification information for identifying original image data of the thumbnail image data.

When the CPU 32 of the multifunction device 10 acquires the X pieces of image information from the target SP server 100, the CPU 32 generates display data indicating the image selection screen (see SC7 of FIG. 10) in S154. Specifically, the CPU 32 first acquires layout data (see FIG. 2) identified by the layout ID "LY3" from the memory 34. The acquired layout data includes the three areas A7 to A9, as illustrated in FIG. 2. The CPU 32 adds the respective thumbnail image data within the X pieces of image information to the respective areas A7 to A9. Accordingly, the display data is completed. The CPU 32 supplies the display data to the display unit 14 and causes the display unit 14 to display the image selection screen SC7 of FIG. 10. In the example of FIG. 10, the image selection screen SC7 includes three thumbnail images indicating figures, such as a star.

In S156 of FIG. 6, the user selects a desired thumbnail image (for example, the figure of the star) in the image selection screen SC7. In this case, the CPU 32 of the multifunction device 10 supplies the selection information including an image ID "ID11" to the mediation server 50 in S158. The image ID "ID11" is an image ID associated with the thumbnail image data indicating the thumbnail image selected by the user among the X image IDs included in the X pieces of image information of S152.

When the CPU 72 of the mediation server 50 acquires the selection information from the multifunction device 10, the CPU 72 supplies a DL (Download) URL request including the image ID "ID11" within the selection information to the target SP server 100 in S160.

When the target SP server 100 acquires the DLURL request from the mediation server 50, the target SP server 100 supplies the DLURL to the mediation server 50 in S162. The DLURL is a URL indicating a location of image data identified by the image ID "ID11", that is, a location of the image data which is a download target.

In S170, the CPU 72 of the mediation server 50 generates print conditions screen information. The print conditions screen information is information for causing the display unit 14 of the multifunction device 10 to display a print conditions screen (see SC8 of FIG. 10). Specifically, the CPU 72 determines one layout ID "LY4" (see FIG. 2), and generates print conditions screen information including respective character strings indicating respective items (that is, image quality, paper, and size) of the print conditions, each option of each item, and the layout ID "LY4." However, the layout data (see FIG. 2) identified by the layout ID "LY4" does not include an area for displaying a service OB corresponding to the target service name "SVE." Therefore, the CPU 72 generates the print conditions screen information not including the target service URL "USE." Then, the CPU 72 supplies the print conditions screen information to the multifunction device 10 in S172.

When the CPU 32 of the multifunction device 10 acquires the print conditions screen information from the target SP server 100, the CPU 32 generates display data indicating the print conditions screen (see SC8 of FIG. 10) in S174. Specifically, the CPU 32 first acquires the layout data (see FIG. 2) identified by the layout ID "LY4" from the memory 34. The acquired layout data includes the two areas A10 and A11, as illustrated in FIG. 2. The CPU 32 describes each character string within the print conditions screen information in the area A10 and describes each option within the print conditions screen information in the area A11. Accordingly, the display data is completed. The CPU 32 supplies the display data to the display unit 14 and causes the display unit 14 to display the print conditions screen SC8 of FIG. 10.

In S176 of FIG. 6, the user selects desired print conditions in the print conditions screen SC8. Further, for an item "Image quality," either "Fine" or "Normal" can be selected. For an item "Paper," one of a plurality of paper types, including "Common paper" and "Glossy paper," can be selected. For an item "size," one of a plurality of paper sizes, including "A4" and "B4," can be selected. In S178, the CPU 32 of the multifunction device 10 supplies selection information including the selected print conditions to the mediation server 50.

When the CPU 72 of the mediation server 50 acquires the selection information from the multifunction device 10, the CPU 72 supplies a DP instruction to the multifunction device 10 in S180. The DP instruction includes the DLURL of S162 and the print conditions within the selection information of S178. The DP instruction is a command to instruct the multifunction device 10 to download the image data identified by the DLURL and to print the image indicated by the image data according to the print conditions.

When the CPU 32 of the multifunction device 10 acquires the DP instruction from the mediation server 50, the CPU 32 supplies a DL request including the DLURL within the DP instruction to the target SP server 100 in S190.

When the target SP server 100 acquires the DL request from the multifunction device 10, the target SP server 100 supplies the image data identified by the DLURL within the DL request to the multifunction device 10 in S192. That is, the target SP server 100 executes the image data supplying function.

When the CPU 32 of the multifunction device 10 acquires (that is, downloads) the image data from the target SP server 100, the CPU 32 causes the print execution unit 16 to execute printing of the image represented by the acquired image data in S194. Specifically, the CPU 32 executes image processing for printing for the acquired image data using the print conditions within the DP instruction of S180 and generates print data. The image processing for printing includes half tone processing for the acquired image data that is RGB image data having a number of gradations (for example, 256 gradations). Accordingly, print data having relatively less gradations (for example, ON or OFF of a dot) is generated. Further, the image processing for printing includes generating print data having high definition when "Image quality" included in the print conditions indicates "Fine," and includes generating print data having low resolution when "Image quality" included in the print conditions indicates "Normal." Further, the image processing for printing includes generating print data suitable for an aspect ratio corresponding to the "Size" included in the print conditions. Also, the CPU 32 instructs the print execution unit 16 to convey the print paper of a type indicated by "Paper" included in the print conditions, and supplies the generated print data to the print execution unit 16. Accordingly, the print execution unit 16 executes printing for the print paper according to the print data. As a result, the user can acquire print paper in which an image represented by the image data stored in the target SP server 100 (for example, an image corresponding to a thumbnail image indicating a figure of a star selected in S156) has been printed.

Case in which SU is Selected in S116 of FIG. 5; FIG. 7

When the SU is selected in S116 of FIG. 5, the CPU 32 of the multifunction device 10 supplies the selection information indicating the SU as a target communication to the mediation server 50 in S220, as illustrated in FIG. 7.

When the CPU 72 of the mediation server 50 acquires the selection information from the multifunction device 10, the CPU 72 executes a determination of the target SFL information (see S16 of FIG. 4) and determines "OK" or "NG" as a determination result in S230. The determination result of S230 indicates whether the multifunction device 10 is capable of executing the SU. When the scan permission information within the target SFL information indicates "NG," the CPU 72 determines "NG" as a determination result. In this case, although not illustrated, the CPU 72 supplies error information for causing display of an error screen SCE of FIG. 9 to the multifunction device 10. That is, the CPU 72 ends the process according to the initial request of S16 of FIG. 4 without supplying each piece of screen information to be described below (see, for example, S242 and S272) to the multifunction device 10. On the other hand, when the scan permission information within the target SFL information indicates "OK," the CPU 72 determines "OK" as a determination result. In this case, the CPU 72 supplies an FD (Folder) information request including the target account name "AN2" and the target password "PN2" (see S98 of FIG. 5) to the target SP server 100 in S232.

When the target SP server 100 acquires the FD information request from the mediation server 50, the target SP server 100 supplies Y pieces of FD information to the mediation server 50 in S234. The Y pieces of FD information are information on Y folders (that is, a folder name and a folder ID) stored in the target SP server 100 in association with the target account name "AN2."

When the CPU 72 of the mediation server 50 acquires the Y pieces of folder information from the SP server 100, the CPU 72 generates FD selection screen information in S240. The FD selection screen information is information for causing the multifunction device 10 to display the FD selection screen (see SC9 of FIG. 10). Specifically, the CPU 72 determines one layout ID "LY3" (see FIG. 2) and generates FD selection screen information including the Y pieces of folder information of S234 and the layout ID "LY3." The FD selection screen information does not include the target service URL "USE." Then, the CPU 72 supplies the FD selection screen information to the multifunction device 10 in S242.

In S254, when the CPU 32 of the multifunction device 10 acquires the FD selection screen information from the mediation server 50, the CPU 32 generates display data indicating the FD selection screen (see SC9 of FIG. 10). Specifically, the CPU 32 acquires the layout data (see FIG. 2) identified by the layout ID "LY3" from the memory 34. The CPU 32 adds the respective folder names included in the respective pieces of FD information within the FD selection screen information to the respective areas A7 to A9. Accordingly, the display data is completed. The CPU 32 supplies the display data to the display unit 14 and causes the display unit 14 to display the FD selection screen SC9 of FIG. 10. The FD selection screen SC9 includes three folders names "F1" to "F3."

In S256 of FIG. 7, the user selects the desired folder name "F1" in the FD selection screen SC9. In this case, the CPU 32 of the multifunction device 10 supplies selection information including the folder ID "IDD1" to the mediation server 50 in S258. The folder ID "IDD1" is a folder ID associated with the folder name "F1" selected by the user among the Y folder IDs included in the Y pieces of FD information of S242.

When the CPU 72 of the mediation server 50 acquires the selection information from the multifunction device 10, the CPU 72 supplies a UL (Upload) URL request including the folder ID "IDD1" within the selection information to the target SP server 100 in S260.

When the target SP server 100 acquires the ULURL request from the mediation server 50, the target SP server 100 supplies a ULURL to the mediation server 50 in S262. The ULURL is a URL indicating a location within the folder identified by the folder ID "ID11," that is, a location in which image data to be uploaded from the multifunction device 10 is to be stored.

In S270, the CPU 72 of the mediation server 50 generates scan conditions screen information. The scan conditions screen information is information for causing the multifunction device 10 to display a scan conditions screen (see SC10 of FIG. 10). Specifically, the CPU 72 determines one layout ID "LY4" (see FIG. 2) and generates scan conditions screen information including respective character strings indicating respective items (that is, resolution, a form, and a size) of the scan conditions, each option of each item, and the layout ID "LY4." The scan conditions screen information does not include the target service URL "USE." Then, the CPU 72 supplies the scan conditions screen information to the multifunction device 10 in S272.

When the CPU 32 of the multifunction device 10 acquires the scan conditions screen information from the target SP server 100, the CPU 32 generates display data indicating the scan conditions screen (see SC10 of FIG. 10) in S274. Specifically, the CPU 32 first acquires the layout data (see FIG. 2) identified by the layout ID "LY4" from the memory 34. The CPU 32 describes each character string within the scan conditions screen information in the area A10 (see FIG. 2) and describes each option within the scan conditions screen information in the area A11 (see FIG. 2). Accordingly, the display data is completed. The CPU 32 supplies the display data to the display unit 14 and causes the display unit 14 to display the scan conditions screen SC10 of FIG. 10.

In S276 of FIG. 7, the user selects desired scan conditions in the scan conditions screen SC10. Further, for an item "Resolution," one of a plurality of scan resolutions, including "600 dpi" and "300 dpi," can be selected. For an item "Form," one of a plurality of file formats, including "PDF" and "JPEG," can be selected. For an item "Size," one of a plurality of document sizes, including "A4" and "B4," can be selected. In S278, the CPU 32 of the multifunction device 10 supplies the selection information including the selected scan conditions to the mediation server 50.

When the CPU 72 of the mediation server 50 acquires the selection information from the multifunction device 10, the CPU 72 supplies an SU instruction to the multifunction device 10 in S280. The SU instruction includes the ULURL of S262 and the scan conditions within the selection information of S278. The SU instruction is a command to instruct the multifunction device 10 to execute the scanning of the document according to the scan conditions to generate image data, and to upload the image data in the location indicated by the ULURL.

When the CPU 32 of the multifunction device 10 acquires the SU instruction from the mediation server 50, the CPU 32 causes the scan execution unit 18 to execute the scanning of the document according to the scan conditions within the SU instruction in S290. Specifically, the CPU 32 notifies the scan execution unit 18 of a scan resolution indicated by "Resolution" included in the scan conditions, and a document size indicated by "Size" included in the scan conditions. Accordingly, the scan execution unit 18 scans the document having the document size with the scan resolution to generate scan data. Then, the CPU 32 executes image processing for scanning for the scan data to generate the image data. The image processing for scanning includes generating image data having the file format indicated by "Form" included in the scan conditions. Then, the CPU 32 supplies an UL request including the ULURL and the image data to the target SP server 100 in S292.

When the target SP server 100 acquires the UL request from the multifunction device 10, the target SP server 100 stores the image data within the UL request in a location indicated by the ULURL within the UL request. That is, the target SP server 100 executes the image data storage function.

Figure 8:
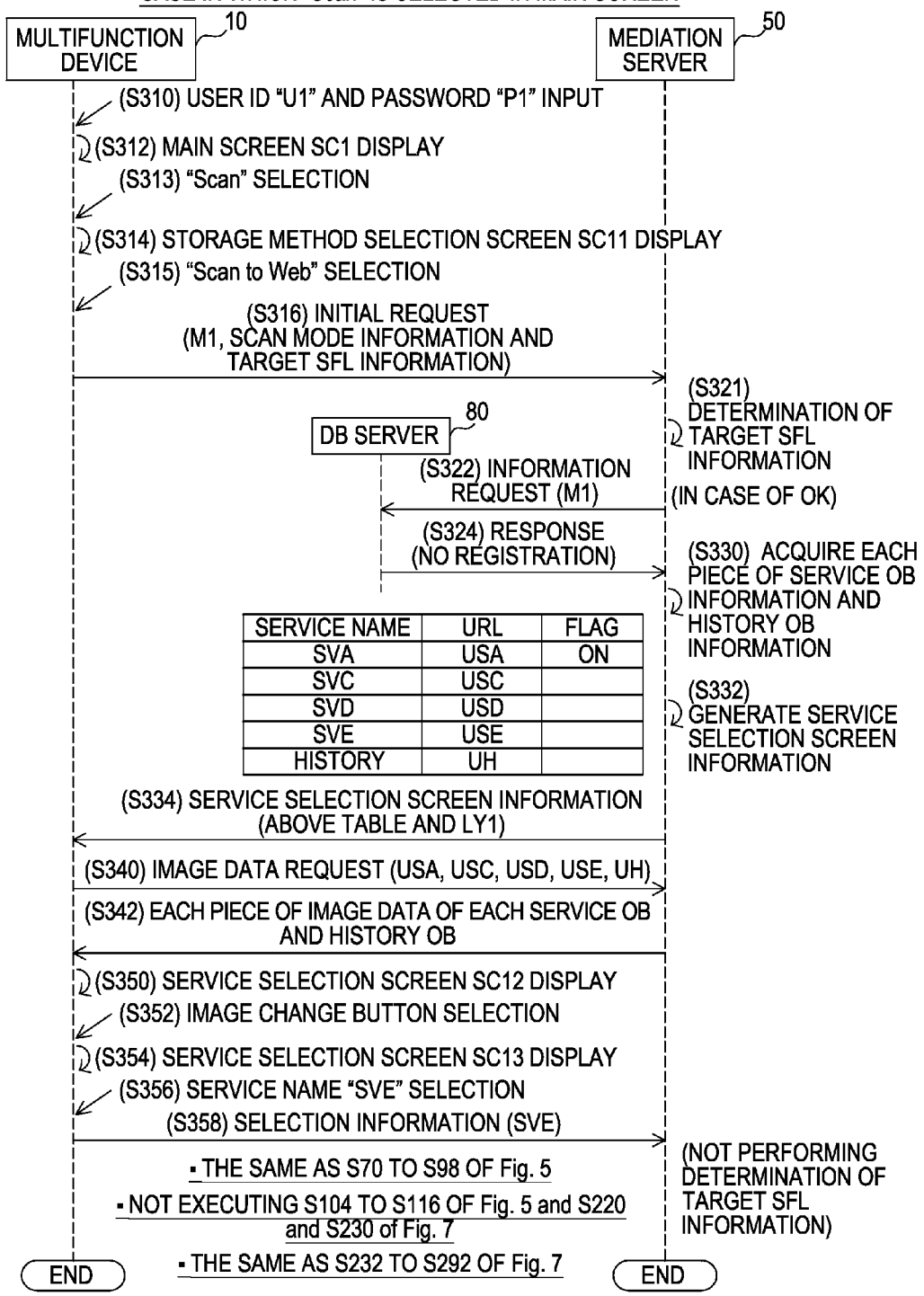
FIG. 8 illustrates each process when "Scan" is selected in a main screen.

Case in which "Scan" is Selected in Main Screen SC1; FIG. 8

Next, each process executed when "Scan" is selected in the main screen SC1 (see FIG. 9) will be described with reference to FIG. 8. Hereinafter, description of the same process as that in FIGS. 4 to 7 will be omitted. S310 and S312 are the same as S10 and S12 of FIG. 4. In S313, the user selects an object indicating "Scan" in the main screen SC1. In this case, the CPU 32 of the multifunction device supplies display data stored in the memory 34 in advance to the display unit 14 and causes the display unit 14 to display the storage method selection screen SC11 of FIG. 9 in S314. The storage method selection screen SC11 is a screen for selecting a storage destination of image data generated by document scanning, and includes three objects. An object indicating "Scan to USB" is an object indicating execution of storage of the image data in a USB memory. An object indicating "Scan to Email" is an object indicating execution of E-mail transmission of the image data. An object indicating "Scan to Web" is an object indicating execution of storage (that is, upload) of the image data in the SP server 100.

In S315 of FIG. 8, the user selects the object indicating "Scan To Web" in the storage method selection screen SC11. In this case, the CPU 32 of the multifunction device 10 supplies the initial request to the mediation server 50 in S316. The initial request includes a MAC address "M1" of the multifunction device 10, scan mode information, and target SFL information. The scan mode information is information included in the initial request when the object indicating "Scan To Web" is selected in the storage method selection screen SC11.

When the CPU 72 of the mediation server 50 acquires the initial request from the multifunction device 10, the CPU 72 executes a determination of the target SFL information and determines "OK" or "NG" as a determination result in S321. The determination result of S321 indicates whether the multifunction device 10 is capable of executing the SU. When the scan permission information within the target SFL information indicates "NG," the CPU 72 determines "NG" as a determination result. In this case, although not illustrated, the CPU 72 supplies error information for causing display of an error screen SCE of FIG. 9 to the multifunction device 10. That is, the CPU 72 ends the process according to the initial request of S316 of FIG. 8 without supplying each piece of screen information to be described below (see, for example, S334) to the multifunction device 10. On the other hand, when the scan permission information within the target SFL information indicates "OK," the CPU 72 determines "OK" as a determination result. In this case, each process of S322, S324, and S330 is executed, similar to S22, S24, and S30 of FIG. 4.

As described above, in the case of FIG. 8, when the CPU 72 of the mediation server 50 acquires the initial request including the scan mode information from the multifunction device 10, the CPU 72 executes a determination of the target SFL information (see S321). Accordingly, the multifunction device 10 can rapidly notify the user that the multifunction device 10 is incapable of executing the SU. On the other hand, in the case of FIG. 4, even when the CPU 72 acquires the initial request including the normal mode information (see S16) from the multifunction device 10, the CPU 72 does not execute the determination of the target SFL information. This is because which of the DP and the SU that the user of the multifunction device 10 desires to execute is still unknown. That is, the initial request of S16 of FIG. 4 is a request supplied from the multifunction device 10 to the mediation server 50 in a state in which either the DP or the SU to be executed (in other words, either the image processing for printing or image processing for scanning to be executed) has been not yet selected by the user. On the other hand, the initial request of S316 of FIG. 8 is a request supplied from the multifunction device 10 to the mediation server 50 in a state in which the SU among the DP and the SU being to be executed (in other words, image processing for scanning being to be executed) has been selected by the user.

In S332, the CPU 72 of the mediation server 50 generates service selection screen information including a table of FIG. 8 and the layout ID "LY1." Specifically, when the CPU 72 generates the table of FIG. 8, the CPU 72 first excludes service OB information corresponding to the SP server 100 incapable of executing the data storage function from each piece of acquired service OB information. In this embodiment, the SP server 100 corresponding to the service name "SVB" is incapable of executing the data storage function (that is, capable of executing only the data supply function). Therefore, the CPU 72 excludes the service OB information including the service name "SVB" from each piece of acquired service OB information. Then, the CPU 72 generates a table using each piece of remaining service OB information and the acquired history OB information. Further, since a response of S324 indicates "No registration," the flag "ON" is described in the top column of the table, as in S32 of FIG. 4.

As described above, in the case of FIG. 8, when the CPU 72 of the mediation server 50 acquires the initial request including the scan mode information from the multifunction device 10, the CPU 72 generates a table in which information on the service name "SVB" of the SP server 100 incapable of executing the data storage function is not described. As a result, the service name "SVB" is not displayed in the service selection screen (see S12 and S13 of FIG. 9) to be described below. Accordingly, it is possible to suppress occurrence of a situation in which the service name "SVB" of the SP server 100 incapable of executing the data storage function is selected, that is, a situation in which the service name "SVB" for which the multifunction device 10 is incapable of executing the SU is selected.

S334 is the same as S34 of FIG. 4. Further, S340 to S354 are the same as S40 to S54 of FIG. 4 except that a matter regarding the service name "SVB" is not included. As illustrated in FIG. 9, the service selection screen SC12 displayed first in the multifunction device 10 includes three service names "SVA," "SVC" and "SVD," without including the service name "SVB," unlike the service selection screen SC2. Further, a service selection screen SC13 displayed next in the multifunction device 10 includes only two service names "SVE" and "history," unlike the service selection screen SC3.

In S356 of FIG. 8, the user selects the service having the service name "SVE" in the service selection screen SC13. In this case, the CPU 32 of the multifunction device 10 supplies selection information including the target service name "SVE" to the mediation server 50 in S358.

Even when the CPU 72 of the mediation server 50 acquires the selection information from the multifunction device 10, the CPU 72 does not execute a determination of the target SFL information. This is because the determination of the target SFL information has been executed in S321. This is different from S60 of FIG. 4. S70 to S98 of FIG. 5 are then executed. However, S104 to S116 of FIG. 5 are not executed and S220 and S230 of FIG. 7 are not executed. Also, S232 to S292 of FIG. 7 are executed. That is, the account selection screen SC4 of FIG. 9 is displayed, and then the FD selection screen SC9 of FIG. 10 is displayed without the communication selection screen SC5 being displayed. This is because the user is known to desire execution of the SU, and thus, it is unnecessary to display the communication selection screen SC5. Accordingly, the user does not select the SU in the communication selection screen SC5. That is, an unnecessary operation for a user is not executed, thereby improving convenience of the user.

Figure 11:
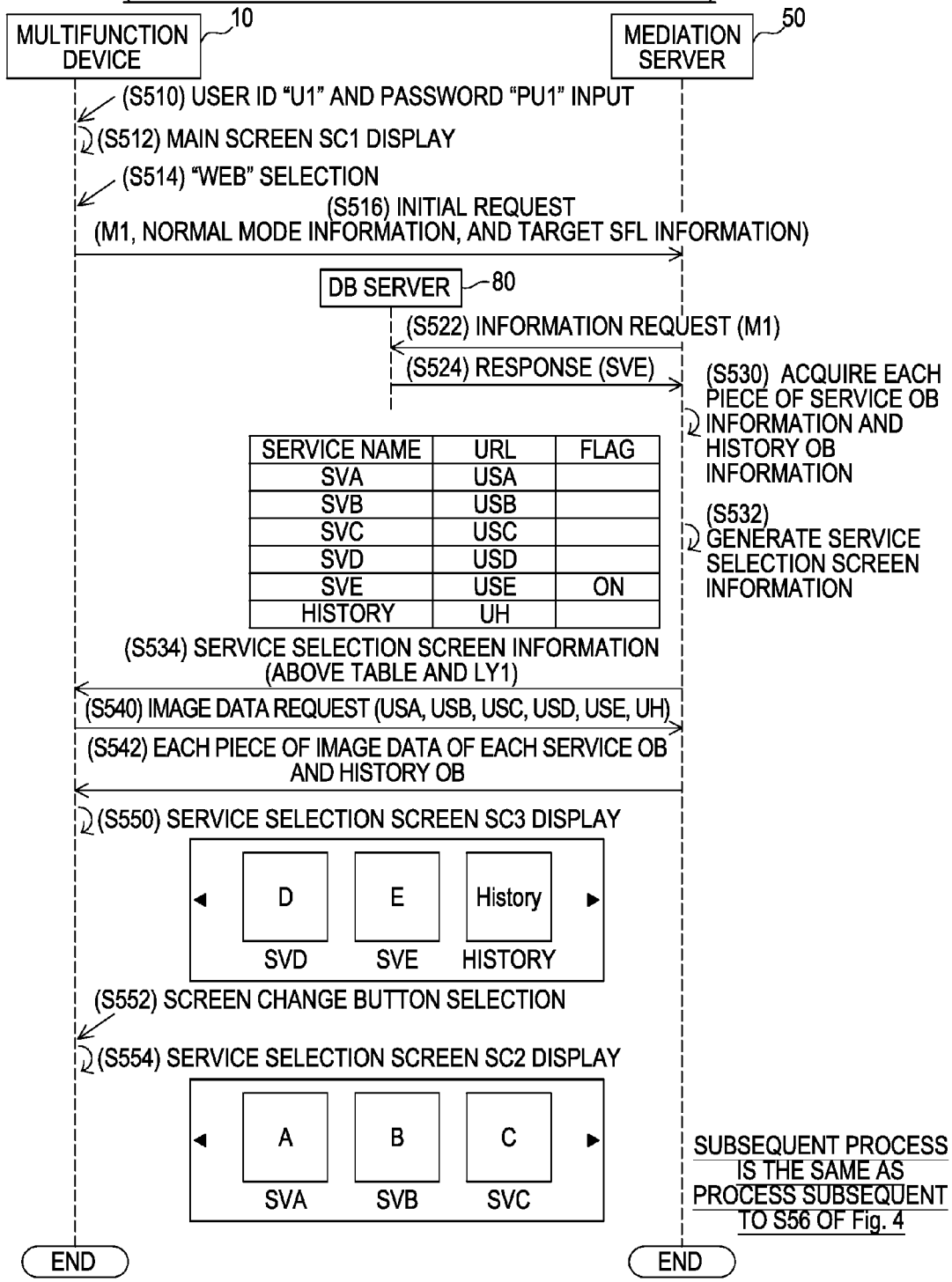
FIG. 11 illustrates each process when "Web" is selected in a main screen in a state in which a service name "SVE" is registered in a database server.

Case (1) in which Service Name "SVE" is Registered in DB Server 80; FIG. 11

As described above, the selected service information in which the MAC address "M1" of the multifunction device 10 and the service name "SVE" are associated is registered in the selected service table 82 within the DB server 80 in S72 of FIG. 5. Then, the multifunction device 10 executes the DP or the SU (see FIG. 6 or 7). Each subsequent process will be described with reference to FIG. 11.

S510 to S522 are the same as S10 to S22 of FIG. 4. In S524, the CPU 72 of the mediation server 50 acquires a response including the service name "SVE" from the DB server 80. S530 to S542 are the same as S30 to S42 of FIG. 4. However, the CPU 72 generates a table in which the flag "ON" is associated with the service name "SVE" since the service name "SVE" is included in the above response in S532.

In S550, the CPU 32 of the multifunction device 10 causes the service selection screen SC3 to be displayed first. This is because the flag "ON" is associated with the service name "SVE" in the table of FIG. 11. Accordingly, the user can first view the service selection screen SC3 including the previously selected service name "SVE." Therefore, when the user desires to select the same service name as the previously selected service name "SVE" again, the user can easily select the service name "SVE." Further, when the screen change button is selected in S552, the CPU 32 causes the service selection screen SC2 to be displayed in S554. Each subsequent process is the same as each process subsequent to S56 of FIG. 4.

Figure 12:
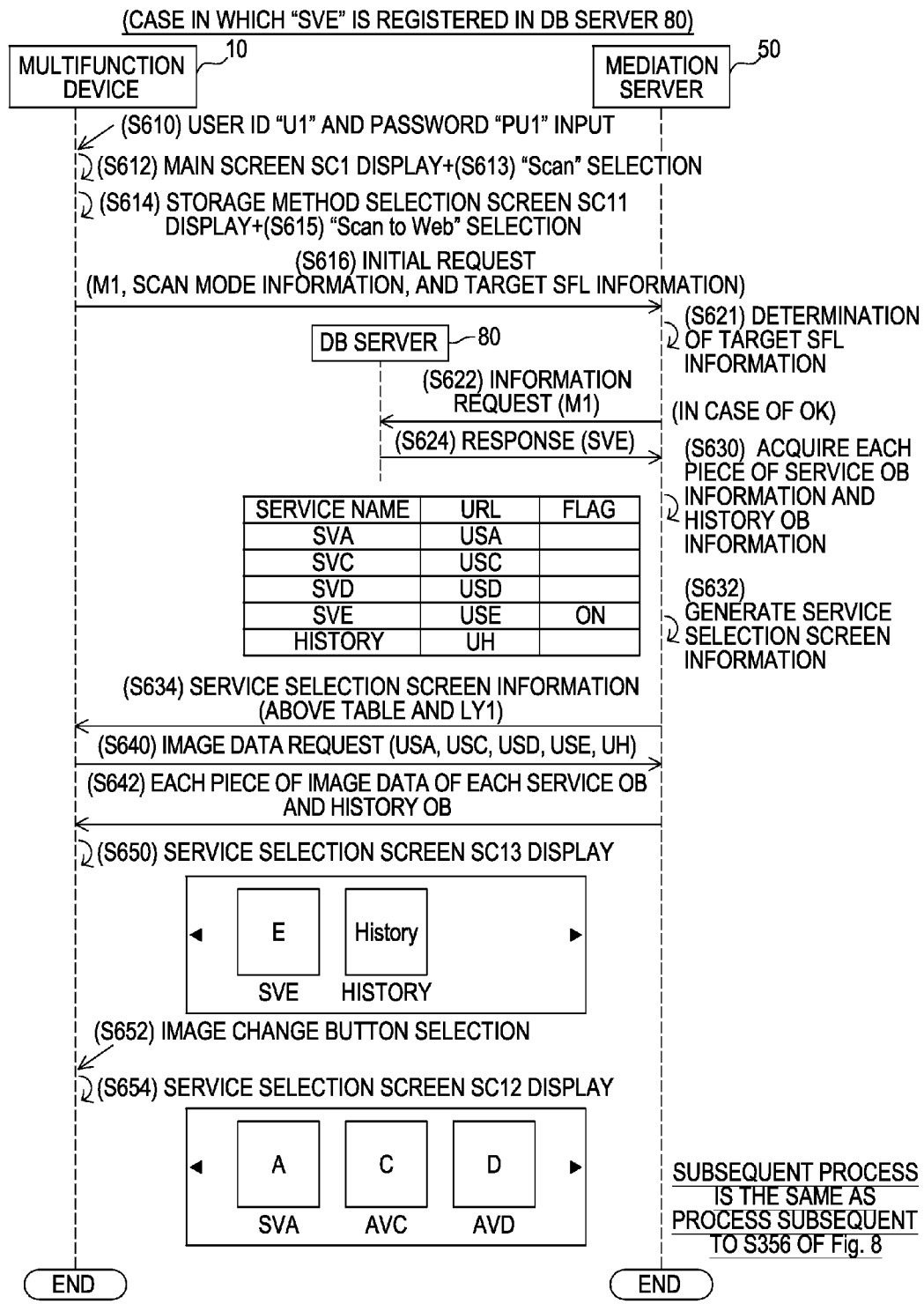
FIG. 12 illustrates each process when "Scan" is selected in the main screen in a state in which the service name "SVE" is registered in the database server.

Case (2) in which Service Name "SVE" is Registered in DB Server 80; FIG. 12

In the case of FIG. 11, "Web" is selected in the main screen SC1 in a state in which the service name "SVE" is registered in the DB server 80 in association with the MAC address "M1" (see S514 of FIG. 11). On the other hand, in the case of FIG. 12, "Scan" is selected in the main screen SC1 in a state in which the service name "SVE" is registered in the DB server 80 in association with the MAC address "M1."

S610 to S622 are the same as S310 to S322 of FIG. 8. In S624, the CPU 72 of the mediation server 50 acquires a response including the service name "SVE" from the DB server 80. S630 to S642 are the same as S330 to S342 of FIG. 8. However, the CPU 72 generates a table in which the flag "ON" is associated with the service name "SVE" since the service name "SVE" is included in the response in S632. Therefore, the CPU 32 of the multifunction device 10 causes the service selection screen SC13 including the service name "SVE" to be displayed first in S650. Also, when the screen change button is selected in S652, the CPU 32 causes the service selection screen SC12 to be displayed first in S654. Each subsequent process is the same as each process subsequent to S356 of FIG. 8.

Figure 13:
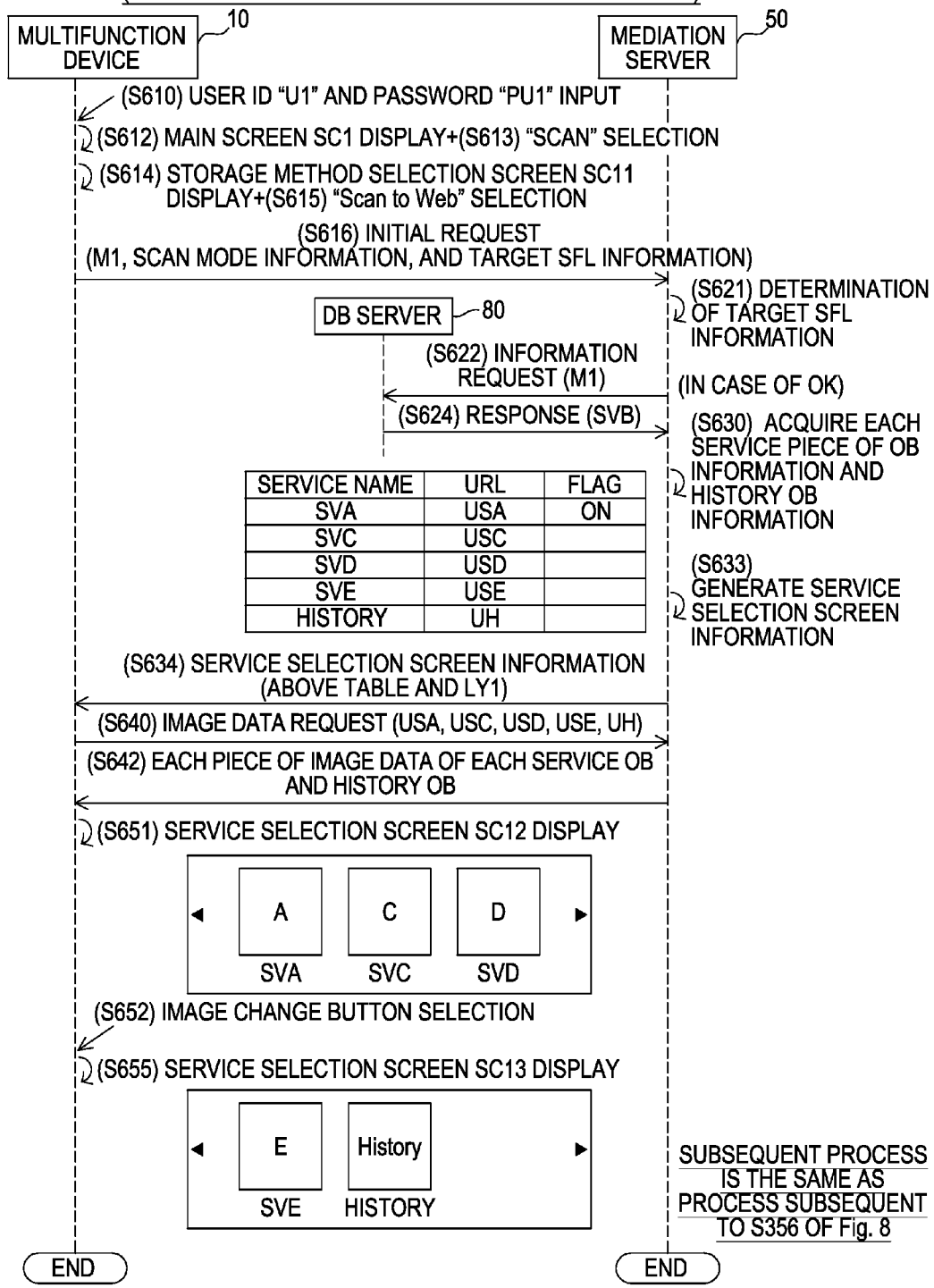
FIG. 13 illustrates each process when "Scan" is selected in the main screen in a state in which a service name "SVB" is registered in the database server.

Case in which Service Name "SVB" is Registered in the DB Server 80; FIG. 13

In this case, "Scan" is selected in the main screen SC1 in a state in which the service name "SVB" is registered in the DB server 80 in association with the MAC address "M1." Among respective processes of FIG. 13, the same processes as those in FIG. 12 are denoted with the same step numbers as those in FIG. 12. Hereinafter, only S625, S633, S651, and S655 will be described.

In S625, the CPU 72 of the mediation server 50 acquires the response including the service name "SVB" from the DB server 80. In S633, since the service name "SVB" is included in the response but is not present in the table, the CPU 72 of the mediation server 50 generates a table in which the flag "ON" is associated with the service name "SVA" in the top column. Therefore, the CPU 32 of the multifunction device 10 causes the service selection screen SC12 including the service name "SVA" to be displayed first in S651. Also, when the screen change button is selected in S652, the CPU 32 causes the service selection screen SC13 to be displayed in S655.

In the case of FIG. 12, since the service name "SVE" registered in the DB server 80 is included in the table, the mediation server 50 generates a table in which the flag "ON" is associated with the service name "SVE." On the other hand, in the case of FIG. 13, when the service name "SVB" registered in the DB server 80 is not included in the table, the mediation server 50 generates the table in which the flag "ON" is associated with the service name "SVA" in the top column. Thus, the mediation server 50 can appropriately describe the flag "ON" according to whether the service name registered in the DB server 80 is included in the table. That is, the mediation server 50 can appropriately determine an order in which the multifunction device 10 displays the service selection screens SC12 and SC13.

Figure 14:
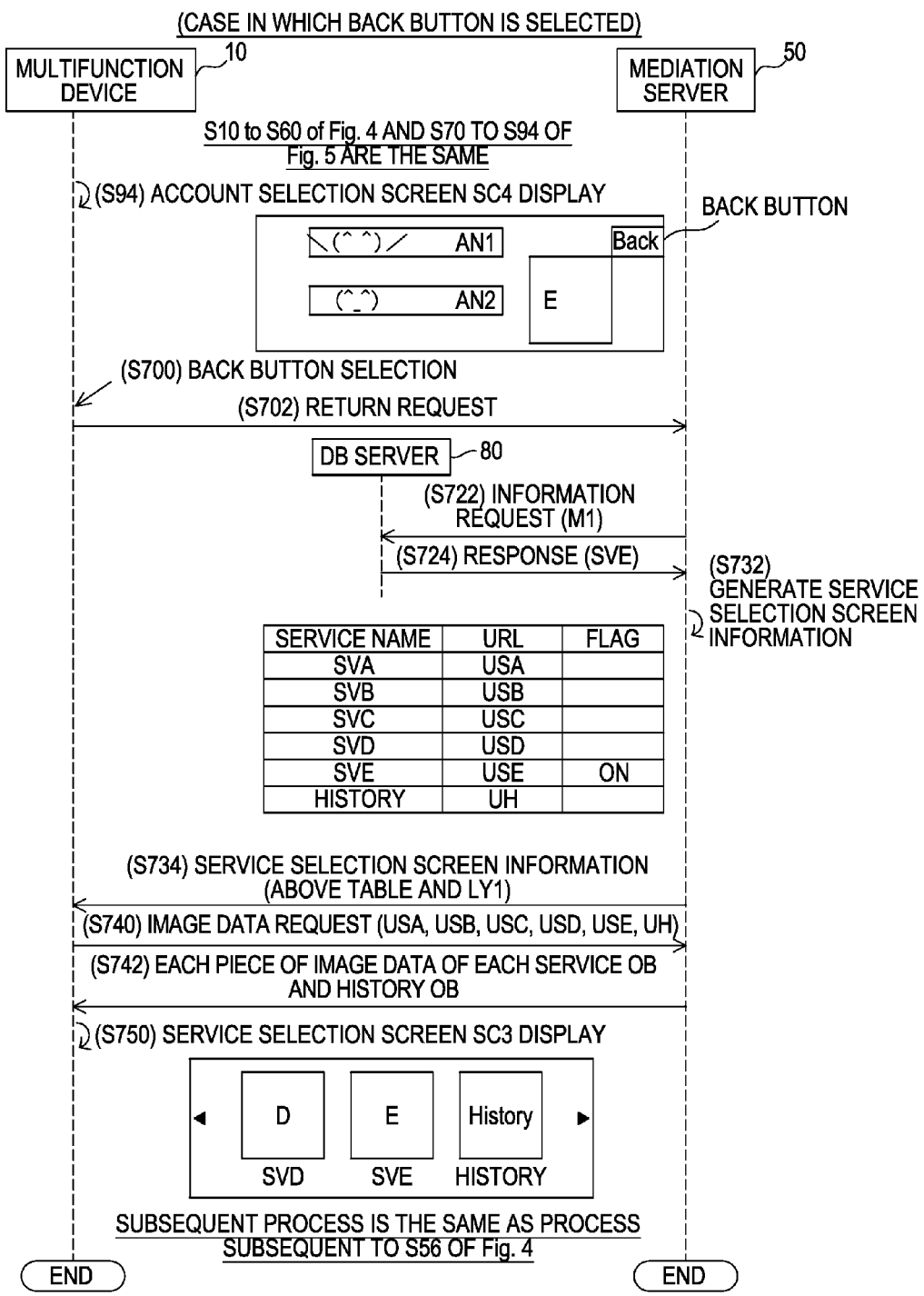
FIG. 14 illustrates each process when a back button is selected in an account selection screen.

Case in which Back Button is Selected in Account Selection Screen SC4; FIG. 14

Next, each process when the back button is selected in the account selection screen SC4 will be described. In this case, S10 to S60 of FIG. 4 and S70 to S94 of FIG. 5 are executed. Therefore, the service name "SVE" is registered in association with the MAC address "M1" in the DB server 80 in S72 of FIG. 5. In S700, the user selects the back button in the account selection screen SC4. In this case, the CPU 32 of the multifunction device 10 supplies a return request to the mediation server 50 in S702.

When the CPU 72 of the mediation server 50 acquires the return request from the multifunction device 10, the CPU 72 supplies an information request including the MAC address "M1" to the DB server 80 in S722. In S724, the CPU 72 acquires a response including the service name "SVE" from the DB server 80. S732 to S742 are the same as S532 to S542 of FIG. 11. Since the service name "SVE" is included in the response, the CPU 72 generates a table in which the flag "ON" is associated with the service name "SVE" in S732. Therefore, the CPU 32 of the multifunction device 10 causes the display service selection screen SC3 including the service name "SVE" to be displayed first in S750. Each subsequent process is the same as each process subsequent to S56 of FIG. 4.

As described above, in this case, when the service name "SVE" is selected in the service selection screen SC3, the service name "SVE" is registered in the DB server 80 before the account selection screen SC4 is displayed (see S72 of FIG. 5). Therefore, when the back button is selected in the account selection screen SC4, the mediation server 50 can acquire the service name "SVE" from the DB server 80 (see S724), and, as a result, can cause the multifunction device 10 to first display the service selection screen SC3 including the service name "SVE." Therefore, the user can easily understood the service name "SVE" selected by the user.

Figure 15:
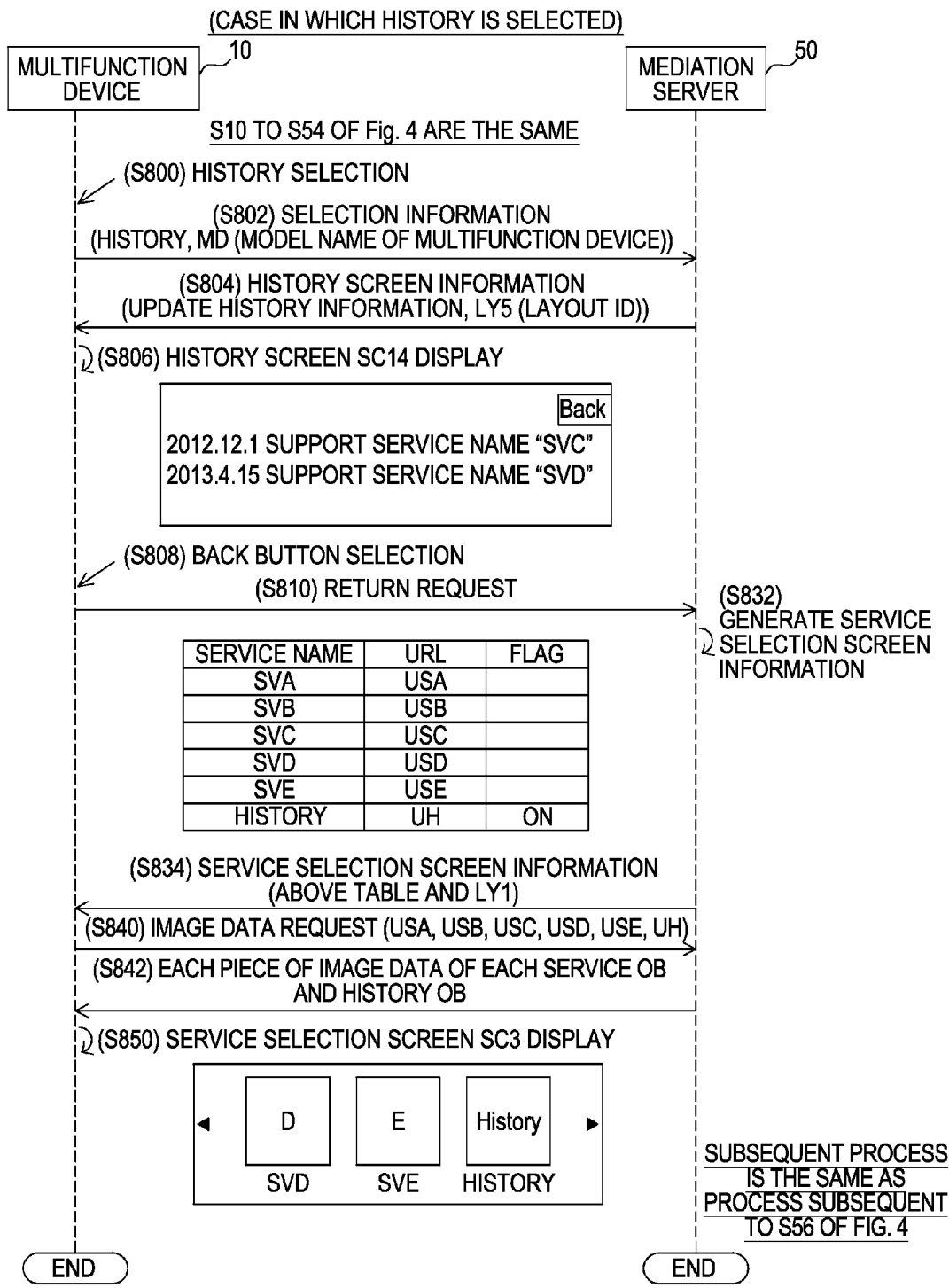
FIG. 15 illustrates each process when a history is selected in a service selection screen.

Case in which "History" is Selected in Service Selection Screen SC3; FIG. 15

Next, each process when the service name "history" is selected in the service selection screen SC3 will be described. In this case, S10 to S54 of FIG. 4 are executed. In S800, the user selects the service name "history" in the service selection screen SC3. In this case, the CPU 32 of the multifunction device 10 supplies selection information including the service name "history" and a model name "MD" of the multifunction device 10 to the mediation server 50.

Even when the CPU 72 of the mediation server 50 acquires the selection information from the multifunction device 10, the CPU 72 does not register the service name "history" in the DB server 80. This is different from S70 of FIG. 5. In S804, the CPU 72 supplies history screen information to the multifunction device 10. The history screen information is information for causing a history screen SC14 to be displayed, and includes update history information, and a layout ID "LY5." The update history information is information corresponding to the model name "MD" of the multifunction device 10, and is stored in the memory 74 in advance (not illustrated). The update history information is information on a history indicating a service supported by the multifunction device (for example, 10) having the model name "MD," and time when the service is supported. Further, the layout ID "LY5" is not illustrated in FIG. 2.

When the CPU 32 of the multifunction device 10 acquires the history screen information from the mediation server 50, the CPU 32 generates display data for causing the display unit 14 to display the history screen SC14 in S806. That is, the CPU 32 acquires the layout data identified by the layout ID "LY5" from the memory 34 and describes history information within the history screen information in the acquired layout data. Also, the CPU 32 supplies the display data to the display unit 14 and causes the display unit 14 to display the history screen SC14. In S808, the user selects the back button in the history screen SC14. In this case, the CPU 32 supplies a return request to the mediation server 50 in S810.

When the CPU 72 of the mediation server 50 acquires the return request from the multifunction device 10, the CPU 72 generates service selection screen information in S832. S832 to S842 are the same as S32 to S42 of FIG. 4. However, when the CPU 72 acquires the return request after supplying the history screen information, the CPU 72 generates a table in which the flag "ON" is associated with the service name "history." Therefore, the CPU 32 of the multifunction device 10 first display the service selection screen SC3 including the service name "history" in S850. Each subsequent process is the same as each process subsequent to S56 of FIG. 4.

In this case, even when the service name "history" is selected in the service selection screen SC3, the service name "history" is not registered in the DB server 80, as described above. A reason therefor is as follows. That is, since the plurality of services that can be provided by the plurality of SP servers 100 are services related to the DP or the SU, the user is highly likely to fail in remembering the previously selected service in a situation in which one service is to be selected from the plurality of services. Therefore, in this embodiment, a configuration in which the target service name is registered in the DB server 80 (see S72 of FIG. 5) is adopted, and the service selection screen including the target service name is displayed first (see S550 of FIG. 11). Accordingly, the user can easily remember the previously selected service name when viewing the first displayed service selection screen and, as a result, easily select the service name as a previously selected service name. Accordingly, the history supply service is not the service related to the DP or the SU, unlike each service provided by each SP server 100. Accordingly, the user can recognize the history supply service from the plurality of services. Therefore, when the user desires to view the history screen SC14, the user can select the screen change button to switch the service selection screen and easily select the service name "history" even when the service selection screen including the service name "history" is not displayed first. In view of this circumstance, the service name "history" is not registered in the DB server 80 in this embodiment.

Further, when the service selection screen SC2 different from the service selection screen SC3 displayed immediately before the history screen SC14 is displayed despite the back button being selected in the history screen SC14, a sense of discomfort is likely to be given to the user. In order to prevent this, in this embodiment, when the back button is selected in the history screen SC14 (see S808 of FIG. 15), the mediation server 50 causes the multifunction device 10 to first display the service selection screen SC3 including the service name "history" despite no service name "history" being registered in the DB server 80. Accordingly, the service selection screen SC3 displayed immediately before the history screen SC14 can be provided to the user and the sense of discomfort can be prevented from being given to the user.

Figure 16:
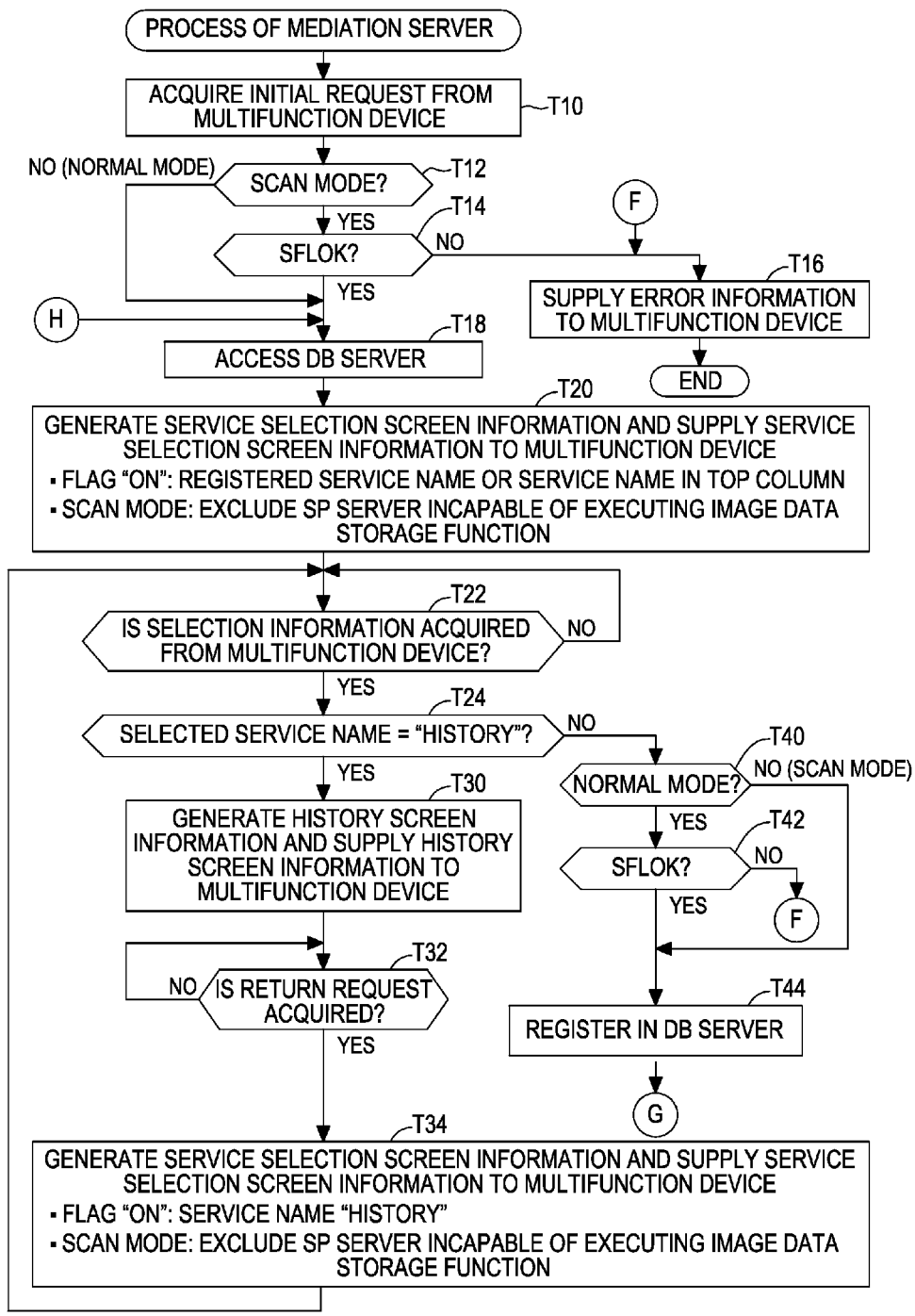
FIG. 16 illustrates a flowchart of each process executed by a mediation server.

Each Process Executed by the Mediation Server 50: FIG. 16

FIG. 16 illustrates a flowchart of each process executed by the CPU 72 of the mediation server 50. Respective cases of FIGS. 4 to 8 and FIGS. 11 to 15 are realized by the CPU 72 executing respective processes according to the flowchart.

In T10, the CPU 72 acquires the initial request from the multifunction device 10. T10 corresponds to S16 of FIG. 4, S316 of FIG. 8, S516 of FIG. 11, and S616 of FIGS. 12 and 13. In T12, the CPU 72 determines whether the scan mode information is included in the initial request. When the scan mode information is included in the initial request, the CPU 72 determines YES in T12 and proceeds to T14. On the other hand, when the normal mode information is included in the initial request, the CPU 72 determines NO in T12, skips T14, and proceeds to T18.

In T14, the CPU 72 executes a determination of the target SFL information. T14 corresponds to S321 of FIG. 8. When the CPU 72 determines the determination result "NG," the CPU 72 determines NO in T14, supplies error information to the multifunction device 10 in T16, and ends the process. T16 corresponds to "NG" being determined (not illustrated) in S321 of FIG. 8. On the other hand, when the CPU 72 determines the determination result "OK," the CPU 72 determines YES in T14 and accesses the DB server 80 in T18. T18 corresponds to S22 of FIG. 4, S322 of FIG. 8, S522 of FIG. 11, and S622 of FIGS. 12 and 13.

In T20, the CPU 72 generates service selection screen information including the flag "ON" according to content of the response acquired from the DB server 80 in T18 and supplies the service selection screen information to the multifunction device 10. T20 corresponds to S32 and S34 of FIGS. 4, S332 and S334 of FIGS. 8, S532 and S534 of FIG. 11, and S633 and S634 of FIGS. 12 and 13. Further, when the scan mode information is included in the initial request of T10, the CPU 72 generates service selection screen information in which the service name corresponding to the SP server incapable of executing the image data storage function has been excluded in T20. This exclusion of the service name corresponds to S332 of FIG. 8 and S633 of FIGS. 12 and 13.

In T22, the CPU 72 waits for the selection information to be acquired from the multifunction device 10. When the CPU 72 acquires the selection information from the multifunction device 10 (YES in T22), the CPU 72 determines whether the service name included in the selection information is "history" in T24. When the service name included in the selection information is "history," the CPU 72 determines YES in T24 and proceeds to T30. The case in which YES is determined in T24 corresponds to the case of FIG. 15. On the other hand, when the service name included in the selection information is a name different from "history," the CPU 72 determines NO in T24 and proceeds to T40. The case in which NO is determined in T24 corresponds to each case of FIGS. 4 and 8.

In T30, the CPU 72 generates history screen information and supplies the history screen information to the multifunction device 10. T30 corresponds to S804 of FIG. 15. In T32, the CPU 72 waits for the return request to be acquired from the multifunction device 10. When the CPU 72 acquires the return request from the multifunction device 10 (YES in T32), the CPU 72 generates service selection screen information including the flag "ON" associated with the service name "history" and supplies the service selection screen information to the multifunction device 10 in T34. T34 corresponds to S832 and S834 of FIG. 15. When T34 ends, the process returns to T22.

In T40, the CPU 72 determines whether the normal mode information is included in the initial request of T10. When the normal mode information is included in the initial request, the CPU 72 determines YES in T40 and executes a determination of the target SFL information in T42. T42 corresponds to S60 of FIG. 4. When the CPU 72 determines the determination result "NG," the CPU 72 determines NO in T42, supplies error information to the multifunction device 10 in T16, and ends the process. T16 executed in the case of NO in T42 corresponds to S62 of FIG. 4. On the other hand, when the CPU 72 determines the determination result "OK," the CPU 72 determines YES in T42 and registers the target service name in the DB server 80 in T44. T44 corresponds to S70 of FIG. 5. Further, when the scan mode information is included in the initial request, the CPU 72 determines NO in T40, skips T42, and proceeds to T44. Skipping T42 corresponds to the determination of the target SFL information being not executed when the selection information of S358 of FIG. 8 is acquired. When T44 ends, the process proceeds to T50 of FIG. 17.

Figure 17:
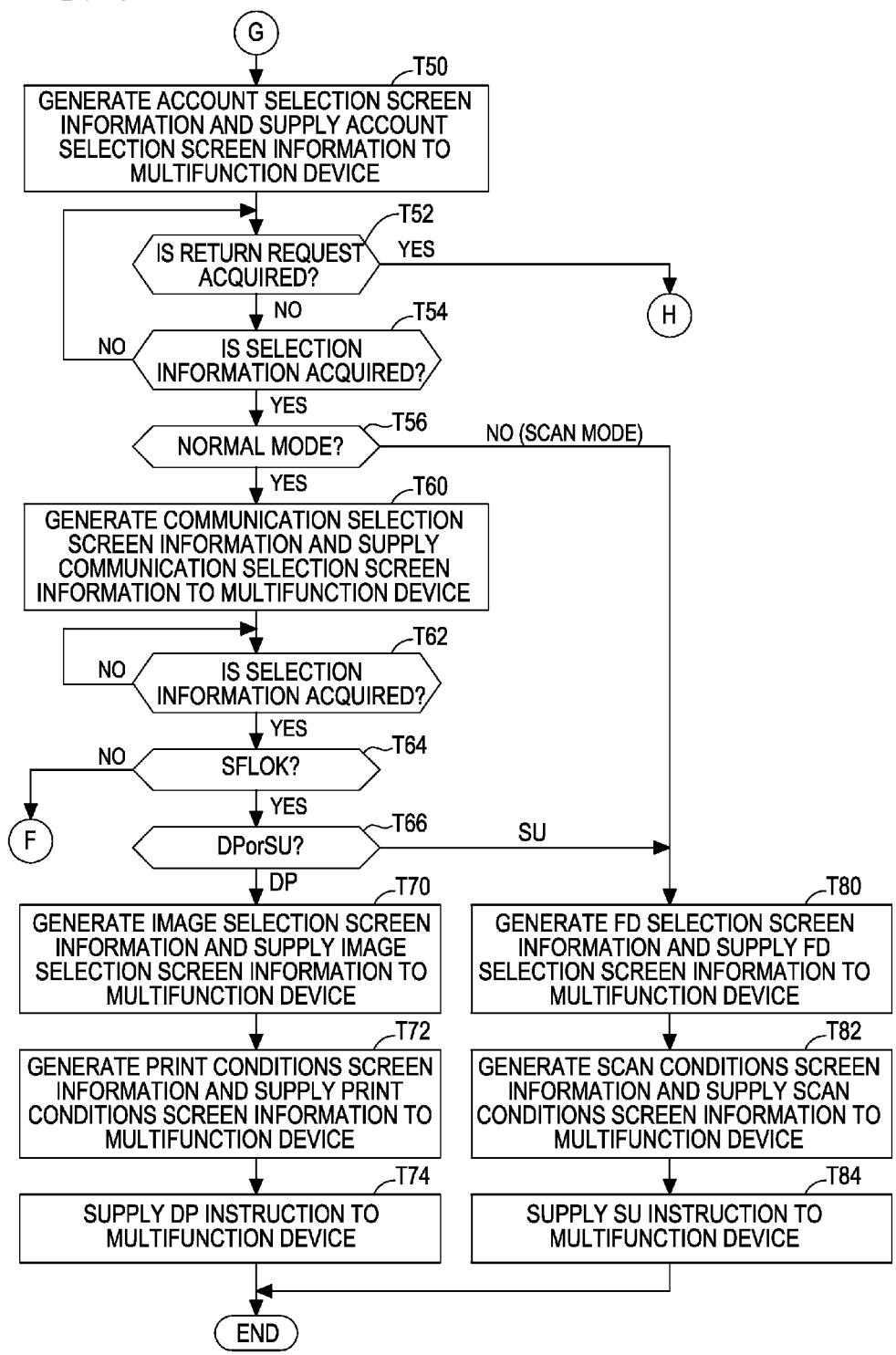
FIG. 17 illustrates a flowchart continued from FIG. 16.

Each Process Continued from FIG. 16; FIG. 17

In T50, the CPU 72 generates account selection screen information and supplies the account selection screen information to the multifunction device 10, as illustrated in FIG. 17. T50 corresponds to S80 and S82 of FIG. 5. The CPU 72 monitors acquiring the return request or the selection information from the multifunction device 10 in T52 and T54. When the CPU 72 acquires the return request from the multifunction device 10 (YES in T52), the CPU 72 proceeds to T18 of FIG. 16, and when the CPU 72 acquires the selection information from the multifunction device 10 (YES in T54), the CPU 72 proceeds to T56. YES in T52 corresponds to a case in which the CPU 72 acquires the return request of S702 of FIG. 14. Further, YES in T54 corresponds to a case in which the CPU 72 acquires the selection information of S98 of FIG. 5.

In T56, the CPU 72 determines whether the normal mode information is included in the initial request of T10 of FIG. 16. When the normal mode information is included in the initial request, the CPU 72 determines YES in T56 and proceeds to T60. When the scan mode information is included in the initial request, the CPU 72 determines NO in T56, skips T60 to T66 and proceeds to T80. YES in T56 corresponds to a case in which the CPU 72 acquires the selection information of S98 of FIG. 5. Further, skipping of T60 to T66 in the case of NO in T56 corresponds to S104 to S116 of FIG. 5 and S220 and S230 of FIG. 7 being not executed in the case of FIG. 8.

In T60, the CPU 72 generates communication selection screen information and supplies the communication selection screen information to the multifunction device 10. T60 corresponds to S104 and S106 of FIG. 5. In T62, the CPU 72 waits for the selection information to be acquired from the multifunction device 10. When the CPU 72 acquires the selection information from the multifunction device 10 (YES in T62), the CPU 72 executes a determination of the target SFL information in T64. T64 corresponds to S130 of FIG. 6 and S230 of FIG. 7.

When the CPU 72 determines the determination result "NG," the CPU 72 determines NO in T64, supplies error information to the multifunction device 10 in T16 of FIG. 16, and ends the process. On the other hand, when the CPU 72 determines the determination result "OK," the CPU 72 determines YES in T64, and determines whether the selection information of T62 indicates "SU" or "DP." in T66. Also, the CPU 72 proceeds to T70 when the selection information of T62 indicates "DP" and T80 when the selection information of T62 indicates "SU."

In T70, the CPU 72 generates image selection screen information and supplies the image selection screen information to the multifunction device 10. T70 corresponds to S140 and S142 of FIG. 6. In T72, the CPU 72 generates print conditions screen information and supplies the print conditions screen information to the multifunction device 10. T72 corresponds to S170 and S172 of FIG. 6. In T74, the CPU 72 supplies a DP instruction to the multifunction device 10. T74 corresponds to S180 of FIG. 6. When T74 ends, the process according to the initial request of T10 of FIG. 16 ends.

In T80, the CPU 72 generates FD selection screen information and supplies the FD selection screen information to the multifunction device 10. T80 corresponds to S240 and S242 of FIG. 7. In T82, the CPU 72 generates scan conditions screen information and supplies the scan conditions screen information to the multifunction device 10. T82 corresponds to S270 and S272 of FIG. 7. In T84, the CPU 72 supplies an SU instruction to the multifunction device 10. T84 corresponds to S280 of FIG. 7. When T84 ends, the process according to the initial request of T10 of FIG. 16 ends.

Correspondence Relationship

The multifunction device 10 and the plurality of SP servers 100 are examples of an "image processing device" and "one or more service providing servers," respectively. The service OB table 76 (see FIG. 3) in the memory 74 of the mediation server 50 is an example of the "database." The two service selection screens SC2 and SC3 or the two service selection screens SC12 and SC13 of FIG. 9 are examples of "one or more service selection screens." Five URLs "USA" to "USE" except for URL "UH" within the table of FIG. 4 are examples of "plural pieces of service-related information." The selection information of S58 of FIG. 4 is an example of the "selection information."

The account selection screen SC4 of FIG. 9 is an example of "first setting screen." The service OB and the target service URL "USE" included in the account selection screen SC4 are examples of the "target service object" and the "target service-related information." The two account names "AN1" and "AN2" included in the account selection screen SC4 are examples of "one or more pieces of user account information." The target account name "AN2" is an example of the "target user account information." The two face OBs included in the account selection screen SC4, and the URLs "UF1" and "UF2" corresponding to the two face OBs are examples of "one or more user objects" and "one or more pieces of user-related information." Further, the communication selection screen SC5 of FIG. 9 is an example of the "first setting screen," as well.

The communication selection screen SC5 of FIG. 9 is an example of the "second setting screen." The face OB and the target face URL "UF2" included in the communication selection screen SC5 are examples of "target user object" and "target user-related information," respectively. The image selection screen SC7 and the print conditions screen SC8 of FIG. 10 are examples of the "third setting screen" and the "fourth setting screen," respectively. Further, the FD selection screen SC9 and the scan conditions screen SC10 of FIG. 10 are examples of the "third setting screen" and the "fourth setting screen," respectively.

The layout ID "LY2" included in the account selection screen information of S82 of FIG. 5 and the layout ID "LY3" included in the image selection screen information of S142 of FIG. 6 are examples of the "first layout identification information," and the "second layout identification information," respectively. S132, S134, S160, S162, and S180 of FIG. 6 are examples of the "mediation communication," and S180, S190, and S192 of FIG. 6 are examples of the "specific communication." Further, S232, S234, S260, S262, and S280 of FIG. 7 are examples of the "mediation communication," as well, and S280 and S292 of FIG. 7 are examples of the "specific communication," as well. The DP instruction and the image processing for printing of S180 of FIG. 6 are examples of "execution instruction," and the "target image processing," respectively. Further, the SU instruction and the image processing for scanning of S270 of FIG. 7 are examples of the "execution instruction" and the "target image processing" respectively.

Second Embodiment; FIG. 18

In the first embodiment, after the target service name "SVE" is selected in the service selection screen SC3 (see S56 of FIG. 4), the mediation server 50 may supply screen information including the target service URL "USE" to the multifunction device 10 (see S82 and S106 of FIG. 5) or may supply screen information not including the target service URL "USE" to the multifunction device 10 (see S142 and S172 of FIG. 6 and S242 and S272 of FIG. 7). Also, when the multifunction device 10 acquires the screen information including the target service URL "USE," the multifunction device 10 displays the screens SC4 and SC5 including the service OB of the target service (see FIG. 9), and when the multifunction device 10 acquires the screen information not including the target service URL "USE," the multifunction device 10 displays the screens SC7 to SC10 (see FIG. 10) that do not include the service OB of the target service. On the other hand, in this embodiment, even when any screen information should be supplied to the multifunction device 10 after the target service name "SVE" is selected in the service selection screen SC3 (see S56 of FIG. 4), the mediation server 50 supplies the screen information including the target service URL "USE" to the multifunction device 10. For example, the mediation server 50 supplies image selection screen information including the target service URL "USE" in S142 of FIG. 6, and supplies print conditions screen information including the target service URL "USE" in S172. Other processes of the mediation server 50 are the same as those in the first embodiment.

When the CPU 32 of the multifunction device 10 acquires any one piece of screen information from the mediation server 50, the CPU 32 executes the process of FIG. 18. In T100, the CPU 32 determines the layout ID included in the acquired screen information. Also, the CPU 32 proceeds to T102 when the layout ID is "LY1," T104 when the layout ID is "LY2," and T106 when the layout ID is "LY3" or "LY4."

In T102, the CPU 32 causes the display unit 14 to display the service selection screen (for example, SC2 and SC3 of FIG. 9). T102 is the same as, for example, S50 and S54 of FIG. 4.

In T104, the CPU 32 causes the display unit 14 to display the account selection screen SC4 or the communication selection screen SC5 (see FIG. 9) according to the acquired screen information. T104 is the same as S94 or S114 of FIG. 5. That is, since the layout data identified by the layout ID "LY2" has the area A6 (see FIG. 2) in which the service OB of the target service can be arranged, the CPU 32 causes the display unit 14 to display the screens SC4 and SC5 including the service OB of the target service using the target service URL "USE" included in the acquired screen information in T104.

In T106, the CPU 32 causes the display unit 14 to display the image selection screen SC7, the print conditions screen SC8, the FD selection screen SC9 or the scan conditions screen SC10 (see FIG. 10) according to the acquired screen information. T106 is the same as S154 and S174 of FIG. 6 and S254 or S274 of FIG. 7. That is, since the layout data (see FIG. 2) identified by the layout ID "LY3" or "LY4," does not have the area in which the service OB of the target service can be arranged, the CPU 32 causes the display unit 14 to display the screen SC7 which does not include the service OB of the target service without using the target service URL "USE" included in the acquired screen information in T106.

According to this embodiment, when the multifunction device 10 acquires the screen information from the mediation server 50, the multifunction device 10 determines whether the service OB of the target service can be included in the screen (T100). Also, when the multifunction device 10 determines that the service OB of the target service can be included in the screen ("LY2" in T100), the multifunction device 10 displays a screen including the service OB of the target service (T104). When the multifunction device 10 determines that the service OB of the target service cannot be included in the screen ("LY3 or LY4" in T100), the multifunction device 10 displays the screen that does not include the service OB of the target service (T106). Thus, the multifunction device 10 can display an appropriate screen according to whether there is a space in which the service OB of the target service can be arranged. In this embodiment, the respective screens SC4, SC5, and SC7 to SC10 are examples of the "first setting screen," and each piece of screen information for causing display of each screen is an example of the "first setting screen information."

While the specific examples of the present invention have been described in detail, these are only illustrative and do not limit the claims. Various variations and modifications of the specific examples illustrated above are included in the technology described in the claims. For example, the following modification examples are included.

Modification Example 1

In each embodiment, a plurality of SP servers 100 for which the mediation server 50 can execute mediation of the service are provided. Alternatively, only one SP server 100 for which the mediation server 50 can execute the mediation of the service may be provided. Also, one SP server 100 may be able to provide a plurality of services. In this case, in S32 of FIG. 4, the CPU 72 of the mediation server 50 may generate service selection screen information for selecting a target service from the plurality of services provided by the one SP server 100. That is, the number of SP servers for which the mediation server can mediate the provision of the service may be one or more.

Modification Example 2

In S32 of FIG. 4, the CPU 72 of the mediation server 50 may generate service selection screen information including each piece of image data corresponding to each service OB (that is, each piece of image data acquired by the multifunction device 10 in S42 of FIG. 4), rather than each URL (see table of FIG. 4) corresponding to each service OB. In this case, even when the CPU 32 of the multifunction device 10 does not supply an image data request of S40, the CPU 32 can acquire each piece of image data from the mediation server 50. In this modification example, each piece of image data included in the service selection screen information is an example of the "service-related information." Similarly, in S80 of FIG. 5, the CPU 72 may generate account selection screen information including each piece of image data corresponding to each face OB, rather than each URL corresponding to each face OB (see table of FIG. 5). In this modification example, each piece of image data included in the account selection screen information is an example of the "user-related information."

Modification Example 3

In each embodiment described above, the CPU 72 of the mediation server 50 generates the service selection screen information including the layout ID and the table related to information to be displayed in S32 of FIG. 4. Alternatively, the CPU 72 may generate display data indicating the service selection screens SC2 and SC3 (that is, first and second display data generated by the multifunction device 10 in S50 of FIG. 4). Similarly, in S80 and S104 of FIG. 5 and S140 and S170 of FIG. 6, the CPU 72 may generate display data indicating the screen to be displayed in the multifunction device 10. In this case, the memory 34 of the multifunction device 10 need not store plural pieces of layout information 36. In this modification example, the respective pieces of display data are examples of the "service selection screen information," and the "first (second, third or fourth) setting screen information."

Modification Example 4

In each embodiment described above, both of each service OB indicating each figure "A" or the like and each service name "SVA" are displayed in the service selection screens SC2 and SC3 of FIG. 9. Alternatively, only each service name may be displayed in the service selection screens SC2 and SC3. In this modification example, each service name included in the service selection screens SC2 and SC3 is an example of the "service object." In this case, the CPU 72 of the mediation server 50 may generate service selection screen information including each service name, in which the service selection screen information includes no URL corresponding to each service OB in S32 of FIG. 4. In this modification example, each service name included in the service selection screen information is an example of the "service-related information."

Modification Example 5

In each embodiment described above, both of each account name and each face OB are displayed in the account selection screen SC4 of FIG. 9. Alternatively, only each account name may be displayed in the account selection screen SC4. In this modification example, each account name included in the account selection screen SC4 is an example of the "user object." In this case, the CPU 72 of the mediation server 50 may generate account selection screen information including each account name, in which the account selection screen information includes no URL corresponding to each face OB, in S80 of FIG. 5. In this modification example, each account name included in the account selection screen information is an example of the "user-related information."

Modification Example 6

In the first embodiment described above, the account selection screen SC4 or the communication selection screen SC5 (see FIG. 9) including the service OB corresponding to the target service is an example of the "first setting screen." However, the "first setting screen" may be a screen for executing other settings related to the target service. For example, in S140 of FIG. 6, the CPU 72 of the mediation server 50 may generate image selection screen information including the target service URL "SVE" so that the image selection screen includes the service OB corresponding to the target service. In this modification example, the image selection screen is an example of the "first setting screen." Similarly, other screens (for example, a print conditions screen, an FD selection screen, and a scan conditions screen) may be examples of the "first setting screen." Further, similarly, the image selection screen, the print conditions screen and the like may be examples of the "second setting screen." Further, for example, the CPU 72 of the mediation server 50 may generate communication selection screen information not including target service URL "SVE" so that the communication selection screen does not include the service OB (that is, the combined OB) corresponding to the target service in S104 of FIG. 5. In this modification example, the communication selection screen is an example of the "third setting screen." Generally speaking, the "first (second or third) setting screen" may be a screen for executing the first (second or third) setting related to the target service.

Modification Example 7

In each embodiment described above, the CPU 72 of the mediation server 50 supplies the DP instruction including the print conditions to the multifunction device 10 in S180 of FIG. 6. Alternatively, the CPU 72 may supply the DP instruction not including print conditions to the multifunction device 10. In this case, the CPU 32 of the multifunction device 10 may temporarily store the print conditions selected in S176 in the memory 34, and execute printing according to the print conditions in the memory 34 when the CPU 32 acquires the DP instruction from the mediation server 50. Similarly, in S280 of FIG. 7, the CPU 72 may supply the SU instruction not including scan conditions to the multifunction device 10. That is, "execution instruction of target image processing" may be an instruction not including target image processing conditions.

Modification Example 8

In each embodiment described above, the memory 74 of the mediation server 50 stores the service OB table 76. Alternatively, a server (for example, the DB server 80) different from the mediation server 50 may store the service OB table 76. In this modification example, the server different from the mediation server 50 is an example of the "database." Further, the mediation server 50 and the DB server 80 may be integrally configured.

Modification Example 9

In each embodiment described above, the respective processes of FIGS. 4 to 8 and FIGS. 11 to 17 are realized by the CPU 72 of the mediation server 50 executing the process according to software (that is, a program). Alternatively, at least one of these processes may be realized by hardware such as a logical circuit. Similarly, at least one of the respective processes executed by the multifunction device 10 may be realized by hardware such as a logical circuit.

Further, technical elements described in the present specification or drawings exhibit technical usefulness singly or through various combinations, and are not limited to a combination of claim definitions at the time of filing an application. Further, the technology illustrated in the present specification or drawings simultaneously achieves a plurality of objects, and has technical usefulness by achieving one of these objects.

What is claimed is:

1. A mediation server for mediating provision of a plurality of services from at least one service providing server to an image processing device, the mediation server comprising:

a processor; and memory storing a computer executable program, when executed by the processor, causing the mediation server to execute:

a selection screen information supply instruction of supplying, to the image processing device through the Internet, service selection screen information which causes a display unit of the image processing device to display a service selection screen, the service selection screen being a screen for selecting a target service from among the plurality of services, and the service selection screen information including a plurality of first URLs, each of the plurality of first URLs indicating a location of service image data within a database which stores plural pieces of service image data corresponding to the plurality of services so that a plurality of service images represented by the plural pieces of service image data are included in the service selection screen;

a selection information acquisition instruction of acquiring, through the Internet, selection information indicating the target service from the image processing device, the target service being selected from the service selection screen including the plurality of service images represented by the plural pieces of service image data acquired from the database based on the plurality of first URLs;

a setting screen information supply instruction of supplying, to the image processing device, first setting screen information for causing the display unit to display a first setting screen after the selection information is acquired, the first setting screen being a screen for executing a first setting related to the target service, and the first setting screen information including a first target URL indicating a location of a target service image corresponding to the target service within the database among the plurality of first URLs so that the target service image is included in the first setting screen, the target service image being identical to the service image which corresponds to the target service among the plurality of service images and is included in the service selection screen; and a mediation communication execution instruction of executing mediation communication for mediating provision of the target service from a target service providing server among the at least one service providing server to the image processing device after the first setting screen information is supplied, the mediation communication including transmitting, to the image processing device, an execution instruction of target image processing related to the target service.

2. The mediation server according to claim 1, wherein the computer executable program, when executed by the processor, causes the mediation server to further execute:

an acquiring instruction of acquiring the first target URL corresponding to the acquired selection information from the database;

a determination instruction of determining a first layout identification information from among plural pieces of layout identification information, the first layout identification information identifying a layout of the first setting screen to be displayed after the selection information is selected; and a generation instruction of generating first setting screen information including the acquired first target URL and the determined first layout information, and the supplying setting screen information supply instruction causes the mediation server to supply the generated first setting screen information to the image processing device.

3. The mediation server according to claim 1, wherein after the first setting screen information is supplied, the setting screen information supply instruction causes the mediation server to further supply, to the image processing device, second setting screen information for causing the display unit to display a second setting screen different from the first setting screen, the second setting screen includes a screen for executing a second setting related to the target service, the second setting screen information includes the first target URL so that the target service image is included in the second setting screen, and the mediation communication execution instruction causes the mediation server to execute the mediation communication after the first setting screen information and the second setting screen information are supplied.

4. The mediation server according to claim 3, wherein the first setting screen includes a screen for executing the first setting including selecting target user account information from among at least one piece of user account information for receiving the target service, the first setting screen information includes at least one piece of second URLs related to at least one user image corresponding to the at least one piece of user account information so that the at least one user image are included in the first setting screen, and the second setting screen information includes a second target URL related to the target user image among the at least one piece of second URLs so that the target user image corresponding to the target user account information among the at least one user image is included in the second setting screen.

5. The mediation server according to claim 4, wherein the computer executable program, when executed by the processor, causes the mediation server to execute:

an acquiring instruction of acquiring a combined data request transmitted from the image processing device in response to the supply of the second setting screen information, the combined data request including the first URL and the second target URL; and a generation instruction of generating a combined image according to the first URL and the second target URL included in the acquired combined data request;

the setting screen information supply instruction cause the mediation server to supply the generated combined image to the image processing device.

6. The mediation server according to claim 1, wherein after the selection information is acquired, the setting screen information supply instruction causes the mediation server to supply, to the image processing device, third setting screen information for causing the display unit to display a third setting screen different from the first setting screen, the third setting screen includes a screen for executing a third setting related to the target service, the third setting screen information does not include the first target URL so that the target service image is not included in the third setting screen, and the mediation communication execution instruction causes the mediation server to execute the mediation communication after the first setting screen information and the third setting screen information are supplied.

7. The mediation server according to claim 6, wherein when the setting screen information supply instruction causes the mediation server to supply the first setting screen information to the image processing device, the setting screen information supply instruction causes the mediation server to determine first layout identification information for identifying a layout of the first setting screen from among plural pieces of layout identification information, and supply the first setting screen information including the first layout identification information to the image processing device, and when the setting screen information supply instruction causes the mediation server to supply the third setting screen information to the image processing device, the setting screen information supply instruction causes the mediation server to determine second layout identification information for identifying a layout of the third setting screen from among the plural pieces of layout identification information, the second layout identification information being different from the first layout identification information, and supply the third setting screen information further including the second layout identification information to the image processing device.

8. The mediation server according to claim 1, wherein after the first setting screen information is supplied, the setting screen information supply instruction causes the mediation server to supply, to the image processing device, fourth setting screen information for causing the display unit to display a fourth setting screen different from the first setting screen, the fourth setting screen includes a screen for executing a fourth setting for selecting conditions of the target image processing, and the fourth setting screen information does not include the first target URL so that the target service image is not included in the fourth setting screen.

9. A non-transitory computer readable recording medium storing a program for a mediation server for mediating provision of a plurality of services from at least one service providing server to an image processing device, the program, when caused by a computer mounted on the mediation server, causing the mediation server to execute:

a selection screen information supply instruction of supplying, to the image processing device through the Internet, service selection screen information which causes a display unit of the image processing device to display a service selection screen, the service selection screen being a screen for selecting a target service from among the plurality of services, and the service selection screen information including a plurality of first URLs, each of the plurality of first URLs indicating a location of service image data within a database which stores plural pieces of service image data corresponding to the plurality of services so that the plurality of service images represented by the plural pieces of service image data are included in the service selection screen;

a selection information acquisition instruction of acquiring, through the Internet, selection information indicating the target service from the image processing device, the target service being selected from the service selection screen including the plurality of service images represented by the plural pieces of service image data acquired from the database based on the plurality of first URLs;

a setting screen information supply instruction of supplying, to the image processing device, first setting screen information for causing the display unit to display a first setting screen after the selection information is acquired, the first setting screen being a screen for executing a first setting related to the target service, and the first setting screen information including a first target URL indicating a location of a target service image corresponding to the target service within the database among the plurality of first URLs so that the target service image is included in the first setting screen, the target service image being identical to the service image which corresponds to the target service among the plurality of service images and is included in the service selection screen; and a mediation communication execution instruction of executing mediation communication for mediating provision of the target service from a target service providing server among the at least one service providing server to the image processing device after the first setting screen information is supplied, the mediation communication including transmitting, to the image processing device, an execution instruction of target image processing related to the target service.

10. The mediation server according to claim 1, wherein the computer executable program when executed by the processor causes the mediation server to execute a first image data supplying instruction of acquiring the plural pieces of service image data according to the plurality of first URLs included in the service selection screen information, and supplying the acquired image data to the image processing device, and the first setting screen information includes second URLs indicating locations of a plurality of first setting images.

11. The mediation server according to claim 1, wherein the first setting includes a selection of a target user account information among at least two pieces of user account information identifying accounts which receive the target service, and the first setting screen includes the target service image corresponding to the target service and a plurality of face images corresponding to the accounts identified by the at least two pieces of user account information.

12. An image processing device configured to communicate with a mediation server for mediating provision of a plurality of services from at least one service providing server to an image processing device, comprising:

a display unit; and a control device configured to execute:

a selection screen information acquisition instruction of acquiring service selection screen information from the mediation server through the internet, the service selection screen information including a plurality of first URLs, each of the plurality of first URLs indicating a location of service image data within a database which stores plural pieces of service image data corresponding to the plurality of services;

a selection screen display control instruction of causing the display unit to display a service selection screen including the plurality of service images using the service selection screen information;

a selection information supply instruction of supplying, through the Internet, selection information indicating a target service to the mediation server when a user of the image processing device selects the target service from among the plurality of services in the service selection screen;

a setting screen information acquisition instruction of acquiring first setting screen information from the mediation server after the selection information is supplied, the first setting screen information including a first target URL indicating a location of a target service image corresponding to the target service within the database, the target service image being identical to the service image which corresponds to the target service among the plurality of service images and is included in the service selection screen;

a setting screen display control instruction of causing the display unit to display a first setting screen including the target service image using the first setting screen information, the first setting screen being a screen for executing a first setting related to the target service;

a specific communication execution instruction of executing specific communication for receiving the target service from a target service providing server among the at least one service providing server after the user executes the first setting in the first setting screen, the specific communication including receiving an execution instruction of target image processing related to the target service from the mediation server; and an image processing execution instruction of executing the target image processing when the execution instruction is received.

13. The image processing device according to claim 12, wherein each of the plurality of first URLs indicates a location within a database that stores image data indicating a service image related to the first URL.

14. The image processing device according to claim 13, wherein
the program, when executed by the processor, causes the image processing device to execute an acquiring instruction of acquiring the service image according to the first URL included in the received first setting screen information, and
the setting screen display control instruction causes the display unit to display the first setting screen including the acquired service image.

15. The image processing device according to claim 12, wherein
the setting screen information acquisition instruction further causes the image processing device to acquire second setting screen information including the target URLs from the mediation server after the user executes the first setting in the first setting screen,
the setting screen display control instruction further causes the image processing device to cause the display unit to display a second setting screen including the target service image using the second setting screen information, and
the second setting screen includes a screen for executing a second setting related to the target service.

16. The image processing device according to claim 15, wherein the selection information transmitted from the image processing device to the mediation server includes the URLs identifying the service image displayed on the first setting screen after the user executes the first setting in the first setting screen.

17. The image processing device according to claim 15, wherein
the first setting includes selecting target user account information from among at least one piece of user account information for receiving the target service,
the first setting screen information includes at least one piece of user-related information related to at least one user image corresponding to the at least one piece of user account information,
the setting screen display control instruction causes the image processing device to cause the display unit to display the first setting screen including the target service image and the at least one user image,
the second setting screen information includes target user-related information related to a target user image corresponding to the target user account information among the at least one piece of user-related information, and
the setting screen display control instruction causes the image processing device to cause the display unit to display the second setting screen including the target service image and the target user image.

18. The image processing device according to claim 17, wherein the computer executable program, when executed by the processor, causes the image processing device to execute a transmitting instruction of transmitting, to the mediation server, a combined image generating request according to the first target URL and the target user-related information included in the second setting screen information in response to receiving the second setting screen information, and
the setting screen display control instruction causes the display unit to display the second setting screen including the combined image acquired from the mediation server.

19. The image processing device according to claim 12, wherein the program, when executed by the processor, causes the image processing device to execute a determination instruction of determining whether the target service image is able to be included in the first setting screen when the first setting screen information is acquired,
wherein the setting screen display control instruction causes the image processing device to:
cause the display unit to display the first setting screen including the target service image when it is determined that the target service image is able to be included in the first setting screen, and
cause the display unit to display the first setting screen that does not include the target service image when it is determined that the target service image is unable to be included in the first setting screen.

20. The image processing device according to claim 12 further comprising a memory storing layout information in which the layout identification information and a layout of a screen are associated with each other,
wherein the first setting screen information includes the layout identification information identifying a layout of the first setting screen,
wherein in a case in which the layout identification information included in the acquired first setting screen information is a first kind of the layout identification information, the program, when executed by the processor, causes the image processing device to cause the display unit to display the first setting screen including the target server image using the first target URL included in the first setting screen information, and
wherein in a case in which the layout identification information included in the acquired first setting screen information is a second kind of the layout identification information, the program, when executed by the processor, causes the image processing device to cause the display unit to display the first setting screen which does not include the target server image without using the first target URL included in the first setting screen information.

* * * * *